(12) United States Patent
Chen et al.

(10) Patent No.: US 10,957,045 B2
(45) Date of Patent: Mar. 23, 2021

(54) SEGMENTING ULTRASOUND IMAGES

(71) Applicants: University of Notre Dame du Lac, South Bend, IN (US); Honk Kong Polytechnic University, Hong Kong (HK); Chinese University of Hong Kong, Hong Kong (HK)

(72) Inventors: Danny Ziyi Chen, Granger, IN (US); Yizhe Zhang, South Bend, IN (US); Lin Yang, Mishawaka, IN (US); Michael Tin-Cheung Ying, Hong Kong (HK); Anil Tejbhan Ahuja, Hong Kong (HK)

(73) Assignees: University of Notre Dame du Lac, South Bend, IN (US); Honk Kong Polytechnic University, Kowloon (HK); Chinese University of Hong Kong, Sha Tin (HK)

( * ) Notice: Subject to any disclaimer, the term of this patent is extended or adjusted under 35 U.S.C. 154(b) by 198 days.

(21) Appl. No.: 16/346,533

(22) PCT Filed: Dec. 12, 2017

(86) PCT No.: PCT/US2017/065913
§ 371 (c)(1),
(2) Date: Apr. 30, 2019

(87) PCT Pub. No.: WO2018/111940
PCT Pub. Date: Jun. 21, 2018

(65) Prior Publication Data
US 2019/0304098 A1 Oct. 3, 2019

Related U.S. Application Data
(60) Provisional application No. 62/432,849, filed on Dec. 12, 2016.

(51) Int. Cl.
*G06K 9/00* (2006.01)
*G06K 9/62* (2006.01)
(Continued)

(52) U.S. Cl.
CPC .............. *G06T 7/12* (2017.01); *G06K 9/0014* (2013.01); *G06K 9/00147* (2013.01);
(Continued)

(58) Field of Classification Search
USPC ................................. 382/128, 156, 180, 199
See application file for complete search history.

(56) References Cited

U.S. PATENT DOCUMENTS 9,224,068 B1 * 12/2015 Ranzato ............... G06K 9/6255
9,589,374 B1 * 3/2017 Gao ...................... G06T 11/008
(Continued)

OTHER PUBLICATIONS

Zhang et al, Coarse-to-fine stacked fully constitutional nets for lymph node segmentation in ultrasound images, Dec. 2016, IEEE international conference on bioinformatics and biomedicine, pp. 443-448 (Year: 2016).*
(Continued)

*Primary Examiner* — Kathleen Y Dulaney
(74) *Attorney, Agent, or Firm* — Workman Nydegger

(57) ABSTRACT

Optimizations are provided for segmenting tissue objects included in an ultrasound image. Initially, raw pixel data is received. Here, each pixel corresponds to ultrasound information. This raw pixel data is processed through a first fully convolutional network to generate a first segmentation label map. This first map includes a first set of objects that have been segmented into a coarse segmentation class. Then, this first map is processed through a second fully convolutional network to generate a second segmentation label map. This second map is processed using the raw pixel data as a base reference. Further, this second map includes a second set of
(Continued)

objects that have been segmented into a fine segmentation class. Then, a contour optimization algorithm is applied to at least one of the second set of objects in order to refine that object's contour boundary. Subsequently, that object is identified as corresponding to a lymph node.

20 Claims, 19 Drawing Sheets

(51) Int. Cl.
   *G06K 9/34* (2006.01)
   *G06K 9/48* (2006.01)
   *G06T 7/12* (2017.01)
   *G06K 9/46* (2006.01)

(52) U.S. Cl.
   CPC ........... *G06K 9/4628* (2013.01); *G06K 9/627* (2013.01); *G06K 9/6271* (2013.01); *G06K 2209/05* (2013.01); *G06T 2200/24* (2013.01); *G06T 2207/10024* (2013.01); *G06T 2207/10132* (2013.01); *G06T 2207/20084* (2013.01); *G06T 2207/20116* (2013.01); *G06T 2207/30004* (2013.01)

(56) References Cited

U.S. PATENT DOCUMENTS

| 10,751,548 B2* | 8/2020 | Han ..................... G06K 9/3233 |
| 2004/0109595 A1* | 6/2004 | Luo ........................ G06T 7/149 |
| | | 382/132 |
| 2008/0260239 A1* | 10/2008 | Han ..................... G06K 9/4614 |
| | | 382/156 |
| 2009/0129641 A1* | 5/2009 | Zhou ........................ G06T 7/11 |
| | | 382/128 |
| 2012/0002852 A1* | 1/2012 | Karasikov .......... G06K 9/00127 |
| | | 382/128 |
| 2015/0078641 A1* | 3/2015 | Tan ........................... G06T 7/12 |
| | | 382/131 |
| 2017/0124415 A1* | 5/2017 | Choi ..................... G06K 9/628 |
| 2017/0249744 A1* | 8/2017 | Wang ..................... G06T 7/136 |
| 2018/0061046 A1* | 3/2018 | Bozorgtabar ............. G06T 7/11 |
| 2019/0139216 A1* | 5/2019 | Georgescu ................ G06T 7/11 |

OTHER PUBLICATIONS

Roth et al, Improving Computer-Aided Detection Using Constitutional Neural Networks and Random View Aggregation, May 2016, IEEE Transactions on Medical Imaging, vol. 35, No. 5, pp. 1170-1179. (Year: 2016).*
International Search Report and Written Opinion, PCT/US2017/065913, U.S. International Search Authority, Completed Feb. 15, 2018.

* cited by examiner

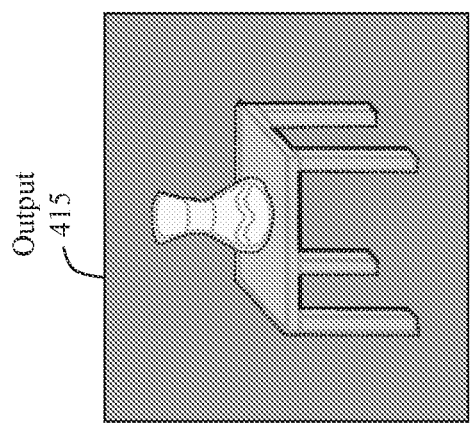
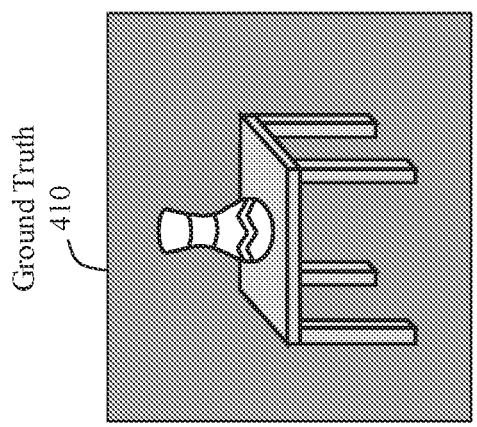
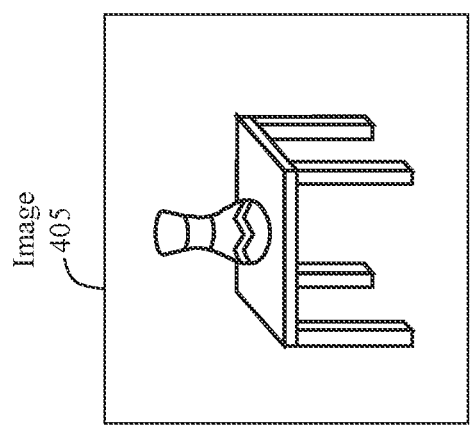
Figure 4

SEGMENTING ULTRASOUND IMAGES

CROSS-REFERENCE TO RELATED APPLICATIONS

This application claims priority to PCT Application No. PCT/US2017/065913 filed Dec. 12, 2017, entitled "SEGMENTING ULTRASOUND IMAGES," which claims the benefit of and priority to U.S. Provisional Patent Application Ser. No. 62/432,849, filed Dec. 12, 2016 entitled "SEGMENTING ULTRASOUND IMAGES". All of the aforementioned are incorporated herein by reference in their entirety.

BACKGROUND

One of the first tasks that a human learns as an infant is the process of recognizing objects. As an infant grows older, that infant's ability to immediately identify objects within his/her surroundings continuously improves. Eventually, infants get to the point where they can scan their surroundings and immediately understand the environment in which they are situated. Similar to scanning an environment, humans also have the ability to examine an image (e.g., a picture) and immediately understand the scene that is illustrated in the image. This ability to examine, recognize, and identify/categorize objects is a learned trait that is developed over time.

In contrast, this ability (i.e. recognizing objects in an image and then classifying those objects) is not an innate process for a computer system. To clarify, computers do not view images in the same manner that a human does. For instance, instead of seeing an artful canvas on which many different colors and objects are illustrated, a computer simply "sees" an array of pixels. The computer must then analyze each of these pixels to determine which pixels belong to which objects in the image.

Similar to how an infant progressively learns to recognize objects, a computer can also be trained to recognize objects. In the case of machine learning, this training process can be accomplished by providing the computer with a large number of images. The computer is then "taught" what a particular object is through a process of identifying that particular object within the images to the computer. By way of example, suppose a user wanted to teach the computer to recognize a dog within an image. To do so, the user will feed a selected number of dog images to the computer and tell the computer that a dog is present in each of those images. The computer can then learn (i.e. machine learning) about the various features of a dog.

For the most part, efforts in teaching a computer how to perform image recognition/classification have been focused on the use of natural images (i.e. images that capture real-world objects) as opposed to medical images (e.g., ultrasound images or MRI images). This bias is due, in part, to the unlimited availability of natural images as compared to the availability of medical images. Another reason is due to the limited number of personnel who are qualified to teach the computer system regarding the objects that are captured in a medical image.

To date, the analysis of medical images is mostly performed by human inspection. In many instances, this process can be quite laborious. Furthermore, the analysis can be wrought with inconsistencies and misidentifications. Accordingly, there exists a substantial need in the field of image recognition and classification to assist a human in analyzing medical images. Even further, there exists a substantial need in the field to enable a computer to examine, recognize, and identify/classify objects within a medical image.

In the case that computer systems are used to analyze medical images, significant processing and algorithm maintenance is required. Further, the resulting digital classifications of images can be error prone. While computer processing of medical images would provide significant technical advantages, the various inaccuracies and processing requirements associated with conventions computer systems place significant technical barriers to wide spread adoption.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Disclosed embodiments are directed to systems, hardware storage devices, and methods for segmenting tissue objects that are included within an ultrasound image.

Initially, raw image data (e.g., an ultrasound image) is received. Here, this raw image data is comprised of an array of pixels, and each pixel comprises ultrasound information. This raw image data is processed through a first fully convolutional network to generate a first segmentation label map. This first segmentation label map includes a first set of objects that have been segmented into a "coarse" segmentation class. Of note, each object within this first set corresponds to a group of pixels from the array of pixels. Then, this first segmentation label map is processed through a second fully convolutional network to generate a second segmentation label map. When the first segmentation label map is processed through the second fully convolutional network, the second fully convolutional network uses the raw image data (e.g., the ultrasound image) as a base reference. The resulting second segmentation label map includes a second set of objects that have been segmented into a "fine" segmentation class. Here, each object within the second set also corresponds to a group of pixels from the array of pixels. Subsequently, a contour optimization algorithm is applied to at least one of the second set of objects in order to refine that object's contour boundary. Additionally, that object is identified as corresponding to a lymph node.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 4 illustrates a high-level overview of a semantic segmentation process.

DETAILED DESCRIPTION

Figure 1:
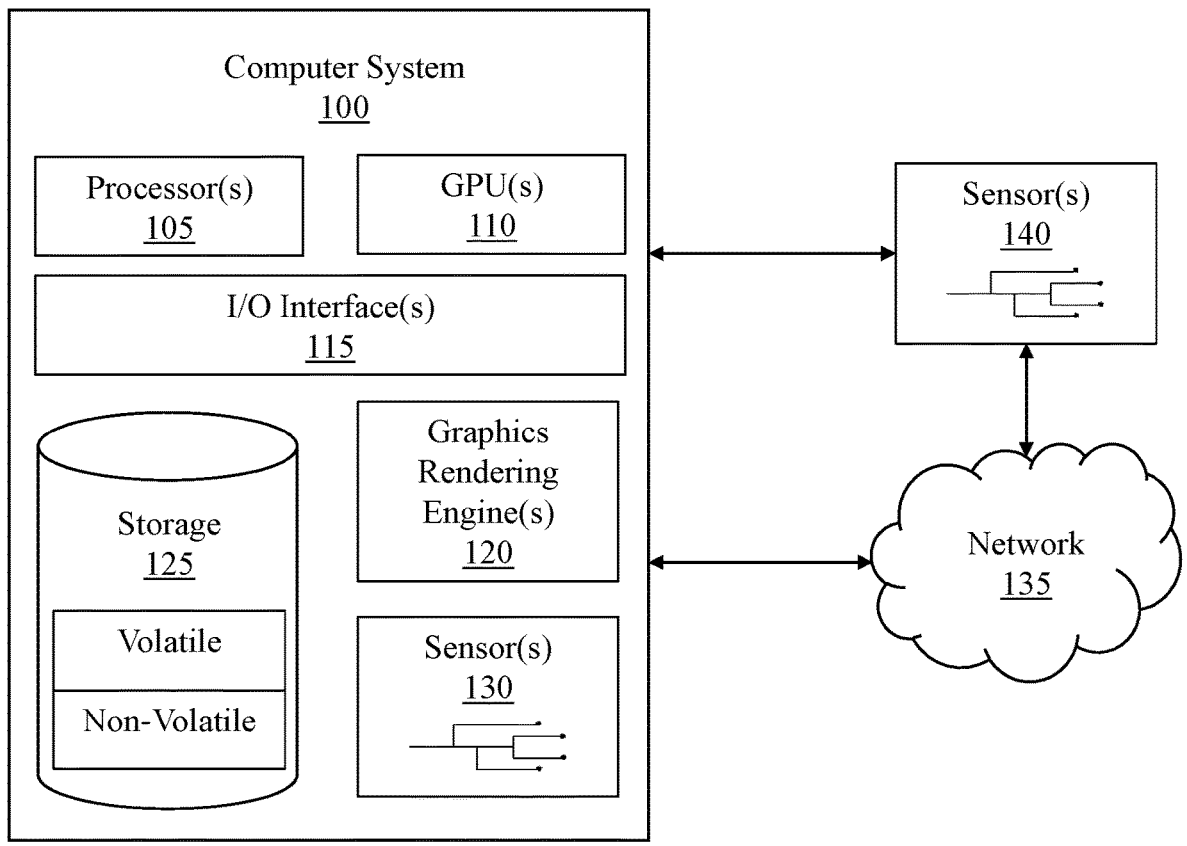
FIG. 1 illustrates an example computer system.

Disclosed embodiments are directed to systems, hardware storage devices, and methods for segmenting tissue objects within an ultrasound image.

As used herein, the term "segmenting" generally refers to the process of examining, recognizing, and identifying/categorizing an object within an image. As used herein, "semantic segmentation" is an analogous term and can be interchangeably used in connection with "segmenting." Further, as used herein an "object" comprises a visually distinguishable portion of an image that is distinct from at least another portion of the image. For example, an object within a medical image may comprise a particular organ, a portion of an organ, a tissue mass, or a particular type of tissue.

The embodiments may be implemented to overcome many of the technical difficulties and computational expenses associated with a computer performing image identification and classification (i.e. segmentation). In particular, the embodiments provide a computerized, automated method of accurately segmenting tissue image objects from within a complex ultrasound image. Such a process greatly assists medical practitioners when they conduct a medical examination. For instance, objects can be identified within medical images with greater accuracy and through the use of less computer resources than previously possible. Accordingly, medical practitioners will be able to provide more accurate and timelier medical assistance to patients.

The disclosed embodiments provide additional benefits by not only identifying objects within a medical image, but by also removing any uncertainties that are associated with those objects. For instance, some objects within a medical image may have visual impairments (e.g., blurred edges or other irregular features) as a result of being captured in the medical image. Disclosed embodiments are able to correct these visual impairments and provide an accurate depiction of those objects.

Additionally, one of skill in the art will appreciate that some tissues may appear to be visually similar to other tissues (e.g., a lymph node may appear to be visually similar to a certain type of blood vessel). It may be difficult for a trained professional, much less a conventional image processing system, to correctly identify tissue types from a medical image. Nevertheless, disclosed embodiments are able to accurately distinguish between visually similar tissue types. Accordingly, the disclosed embodiments provide significant advances in diagnosis and disease identification.

The present embodiments also improve the underlying functionality of a computer system that performs image processing. For instance, the disclosed embodiments are able to perform semantic segmentation in one or more stages. By utilizing a unique staging of the segmentation process, the disclosed embodiments significantly improve how the computer system operates because the computer system's resources are utilized in a much more efficient manner.

To achieve these benefits (and others), the disclosed embodiments segment tissue objects that are included within an ultrasound image. At a high level, the embodiments initially receive raw image data (e.g., an ultrasound image). Here, this raw image data is comprised of an array of pixels, and each pixel comprises ultrasound information. This raw image data, in the form of the array of pixels, is processed through a first fully convolutional network to generate a first segmentation label map. This first segmentation label map includes a first set of objects that have been segmented into a "coarse" segmentation class. Of note, each object within this first set corresponds to a group of pixels from the array of pixels. Then, this first segmentation label map is processed through a second fully convolutional network to generate a second segmentation label map. Of note, this second segmentation label map is processed using the raw image data as a base reference. Further, this second segmentation label map includes a second set of objects that have been segmented into a "fine" segmentation class. Here, each object within the second set also corresponds to a group of pixels from the array of pixels. Then, a contour optimization algorithm is applied to at least one of the second set of objects in order to refine that object's contour boundary. Subsequently, that object is identified as corresponding to a lymph node.

Having just described various high-level features and benefits of the disclosed embodiments, the disclosure will now turn to FIG. 1, which presents an introductory discussion of an example computer system. Following that discussion, an example architecture for segmenting tissue objects will be discussed with respect to FIG. 2. FIGS. 3 through 4, which discuss various aspects of semantic segmentation, will then be presented. Following that disclosure, a discussion on lymph nodes will be presented with respect to FIGS. 5 through 7. Next, various architectures and supporting architectures will be discussed with respect to FIGS. 8 through 9. Following that disclosure, various flow diagrams, example illustrations, methods, and example user interfaces will be detailed with respect to the remaining figures (FIGS. 10 through 19).

Example Computer System

As illustrated in FIG. 1, in its most basic configuration, a computer system 100 includes various different components. For example, FIG. 1 shows that computer system 100 includes at least one hardware processing unit 105, a graphics processing unit (GPU) 110, input/output (I/O) interfaces 115, graphics rendering engines 120, storage 125, and one or more sensors 130.

The storage 125 may be physical system memory, which may be volatile, non-volatile, or some combination of the two. The term "memory" may also be used herein to refer to non-volatile mass storage such as physical storage media. If the computing system 100 is distributed, the processing, memory, and/or storage capability may be distributed as well. As used herein, the term "executable module," "executable component," or even "component" can refer to software objects, routines, or methods that may be executed on the computing system 100. The different components, modules, engines, and services described herein may be implemented as objects or processors that execute on the computing system 100 (e.g. as separate threads).

The disclosed embodiments may comprise or utilize a special-purpose or general-purpose computer including computer hardware, such as, for example, one or more processors (such as processor 105) and system memory (such as storage 125), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors 140 (e.g., ultrasound devices, MRI devices, etc.). Further, the computer system 100 may also be connected through one or more wired or wireless networks 135 to remote systems(s) that are configured to perform any of the processing described with regard to computer system 100.

The graphics rendering engine 115 is configured, with the processor(s) 105 and the GPU 110, to render one or more objects on a user interface.

A "network," like the network 135 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 135. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

As discussed above, computer systems are able to provide a broad variety of different functions. One such function includes performing image processing. Accordingly, attention will now be directed to FIG. 2, which illustrates an example architecture for performing semantic segmentation on an ultrasound image.

Figure 2:
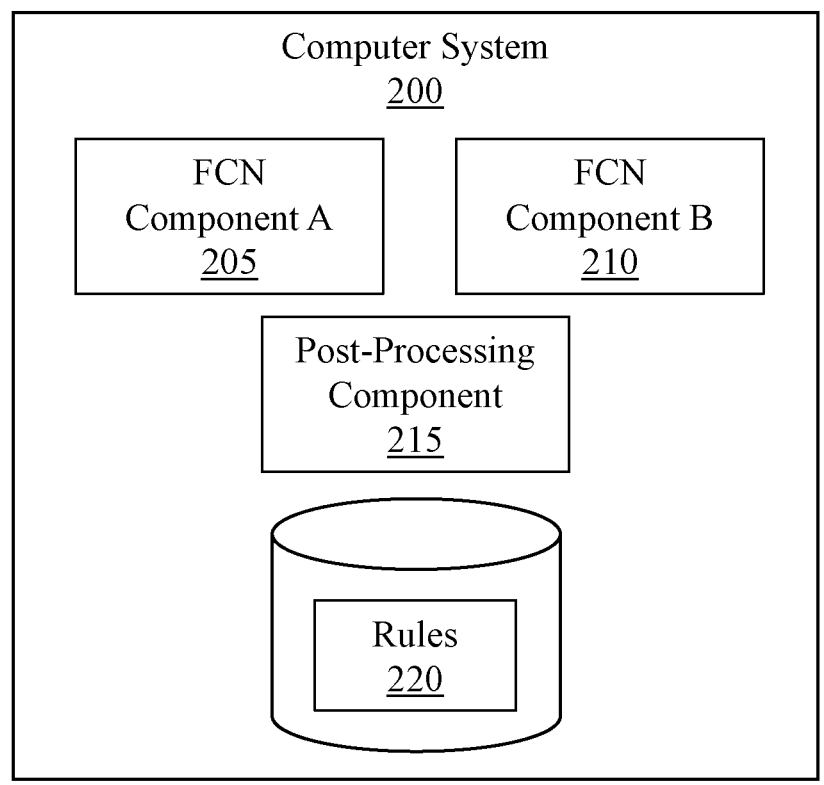
FIG. 2 illustrates an example architecture for segmenting tissue objects from an ultrasound image.
Figure 3:
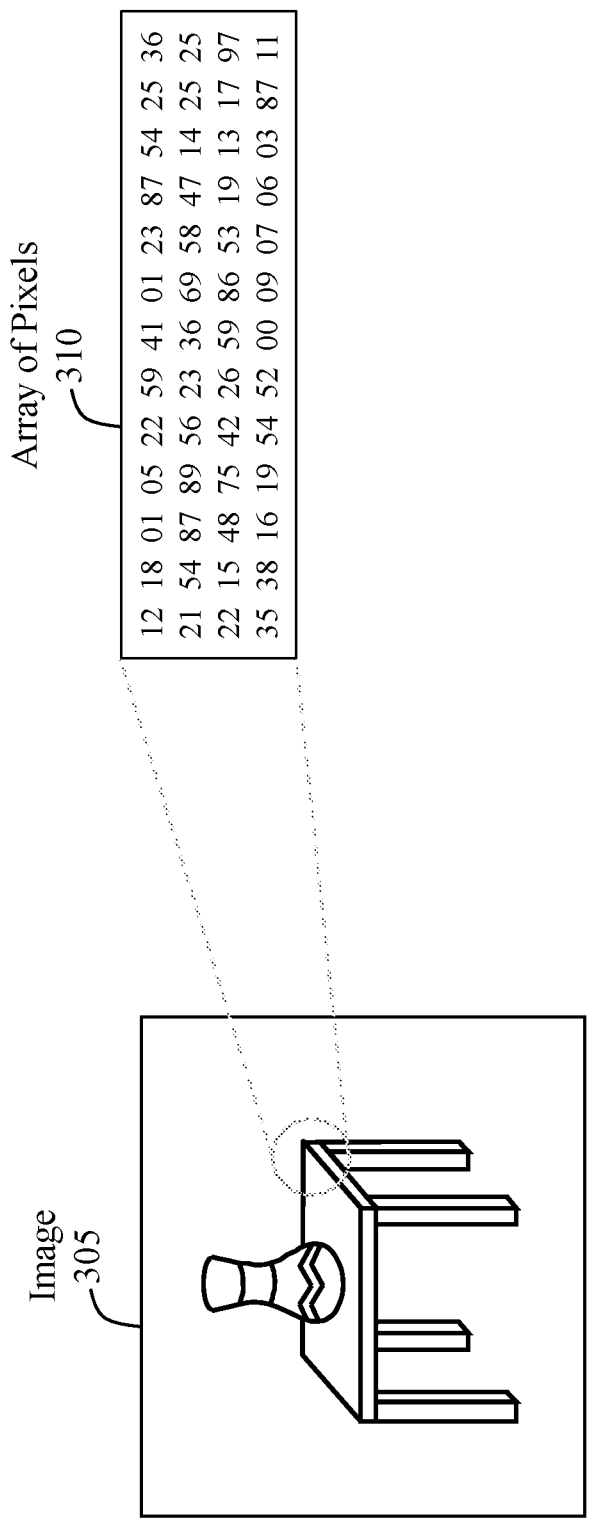
FIG. 3 shows a digital image that is comprised of an array of pixels.

FIG. 2 illustrates a computer system 200 that is analogous to the computer system 100 of FIG. 1. In particular, computer system 200 includes all of the features and functionalities that were discussed in relation to computer system 100 of FIG. 1.

As illustrated, computer system 200 includes a Fully Convolutional Network (FCN) component A 205 and a FCN component B 210. Computer system also includes a post-processing component 215 and storage. Included within this storage is a set of rules 220. The computer system 200 is configured to segment tissue image objects from within an ultrasound image. Further detail on computer system 200's components will be provided later in the disclosure in connection with the methods that are presented herein. Accordingly, attention will now be directed to FIG. 3, which illustrates a high-level overview of how digital images are analyzed.

Semantic Segmentation

There are various different methods for analyzing a digital image. Such methods include object recognition/detection and semantic segmentation, to name a few. Briefly, object recognition is the process of generally identifying one or more objects within an image and distinguishing those objects from one another through the use of bounding boxes. In contrast, semantic segmentation is the process of classifying one or more pixels of a digital image so that each classified pixel belongs to a particular object. Semantic segmentation is a more comprehensive classification scheme. In view of this understanding, the remainder of this disclosure will focus on semantic segmentation.

Turning now to FIG. 3, FIG. 3 provides an illustration of what a computer "sees" when it examines a digital image 305. From a human's perspective, the digital image 305 includes a table and a vase. In contrast to what a human sees, a computer simply sees that the digital image 305 is comprised of an array of pixels 310 (aka an array of pixel values).

It will be appreciated that this array of pixels 310 may be any size. For example, the size of the array of pixels 310 may be 1020×1020, meaning that the array of pixels 310 is 1020 pixels in height by 1020 pixels in width. Depending on whether the image is a color image or a black and white image, the array of pixels 310 may have another dimension value. For example, if the digital image 305 is a color image, then the size of the array of pixels 310 may be 1020×1020× 3, where the 3 indicates that there are three color channels (e.g., RGB). Alternatively, if the digital image 305 is a black and white image, then the size of the array of pixels 310 may be 1020×1020×1, where the 1 indicates that only a single-color channel is present. Here, it will be appreciated that these values are being used for example purposes only and should not be considered as binding or limiting in any manner.

As such, when a computer analyzes the digital image 305, it is actually analyzing the array of pixels 310. Accordingly, the end result of the semantic segmentation process is to enable the computer to accurately examine, recognize, and identify/categorize each object that is present in the digital image 305.

To perform semantic segmentation, the computer system analyzes each pixel that is included in a digital image (e.g., the digital image 305). After understanding the digital image at a pixel-level, the computer system then attempts to group each pixel so that it is associated with a particular identifiable object. As such, the computer system assigns each pixel to an object class.

In the scenario presented in FIG. 3, there is a vase object class, a table object class, a background object class, etc. As a consequence, the computer system will analyze each pixel and attempt to determine which object class that pixel belongs to. By "attempt," it is meant that the computer system will assign a probability metric indicating a determined probability that a particular pixel belongs to a particular object class. By way of example, consider the top right corner edge of the table in the digital image 305. That top right corner is dark in color whereas the background is much lighter in color. By analyzing the pixels, the computer system will assign a high-value probability that the dark areas near the table edge are a part of the table and not a part of the background image. It will be appreciated that this is an example only and should not be considered limiting. Furthermore, semantic segmentation is not based only on pixel intensity (e.g., dark or light pixels).

As discussed earlier and as will be discussed in more detail later, a computer system is trained on how to recognize an image object. For example, at an earlier time, the computer system was provided with a selected number of vase images, table images, background images, etc. By processing these training images through a machine learning algorithm, the computer system learns what a vase looks like, what a table looks like, and so on. When the computer system encounters a new image, such as digital image 305, then the computer system is able to examine the image and use its past learning to identify the objects within that image. As discussed earlier, the computer system assigns a probability metric, or value, to each pixel. This metric indicates a level of confidence that the computer system has with regard to its classifying a particular pixel to a particular object class (e.g., a vase class, a table class, etc.).

FIG. 4 illustrates an example overview of the semantic segmentation process. On the left, FIG. 4 shows an original digital image 405. In the middle, FIG. 4 shows a ground truth image 410. In this context, a "ground truth" image is an image whose image objects (e.g., a vase, table, background, etc.) have been perfectly (or near perfectly) segmented from one another. As such, in at least one embodiment, a ground truth image is considered a "control" image for testing purposes and is used to quantify the accuracy of the semantic segmentation process. On the right, FIG. 4 shows an output image 415 that has undergone semantic segmentation.

The goal of semantic segmentation is to not only accurately identify each object within an image but to also distinguish between the contour boundaries for each of those objects. In the context of FIG. 4, the end goal of semantic segmentation would be to not only accurately identify and label the vase but to also identify its contour boundaries, which boundaries are distinct from the boundaries of the other objects in the image. Furthermore, the semantic segmentation process should also identify and label the table along with its contour boundary.

As can be seen in FIG. 4, the vase is resting on top of the table. As a result, the semantic segmentation process should determine where the vase ends and where the table begins. The output image 415 shows that as a result of the semantic segmentation process, the contour boundary of the vase is delineated, or rather identified as being distinct, from the contour boundary of the table. Furthermore, the contour boundaries of the vase and table are delineated from the background portion. To do this semantic segmentation process, the disclosed embodiments obtain a dense pixel-level understanding of the digital image by analyzing the digital image's array of pixels.

Accordingly, in at least one embodiment, semantic segmentation is a process for examining, recognizing, and identifying/categorizing the various objects that are included within an image. Currently, various methods exist for performing semantic segmentation. One such method for performing semantic segmentation is through the use of a "fully convolutional network" (hereinafter FCN). Additional details on a FCN will be discussed later. Now, however, attention will be directed to an introductory discussion on medical imaging.

Lymph Nodes In Medical Images

Figure 5:
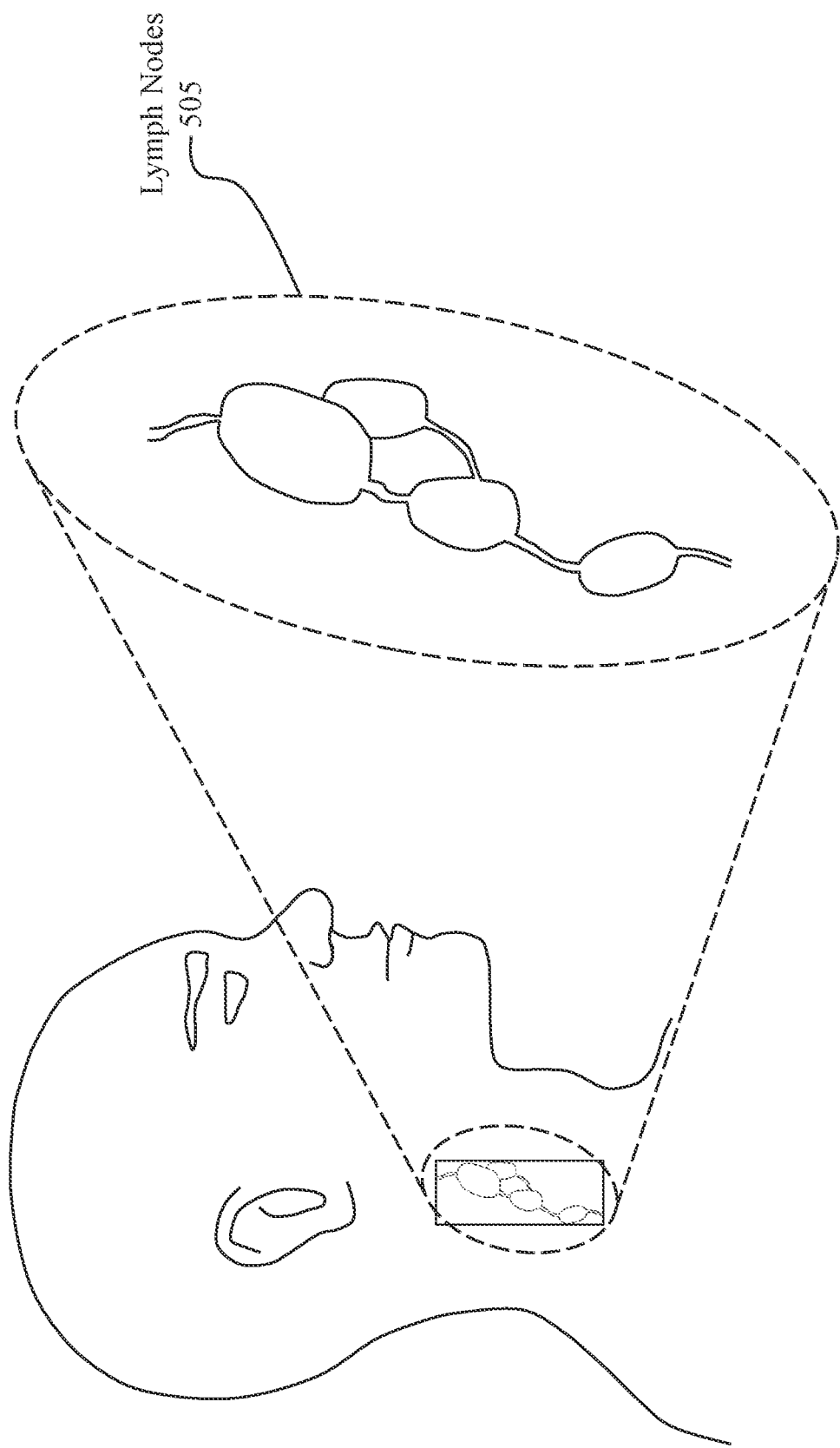
FIG. 5 provides an introduction to lymph nodes.

Turning now to FIG. 5, a brief discussion on lymph nodes will be presented. FIG. 5 shows an abstract view of a human with a group of lymph nodes 505 that have been emphasized to show their features. Lymph nodes are found throughout the human body (e.g., in the neck, armpit, stomach, etc.). They are major sites for immune cells, and they also assist in immune system functions. Although lymph nodes are usually not visible from the outside of a person's body, medical imaging devices (e.g., an ultrasound) are available to capture images of what a lymph node looks like.

Figure 6:
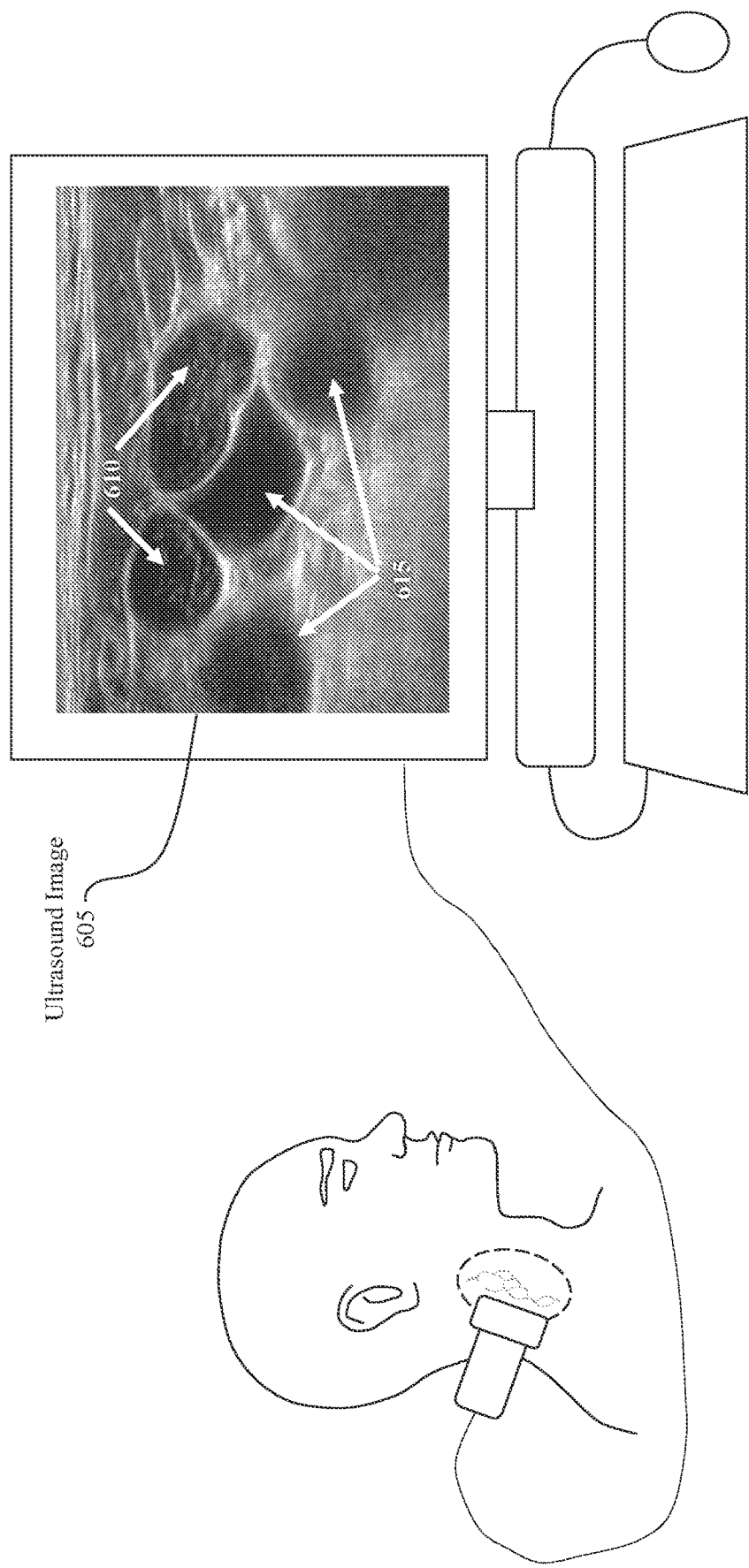
FIG. 6 shows an ultrasound image of a lymph node.
Figure 7:
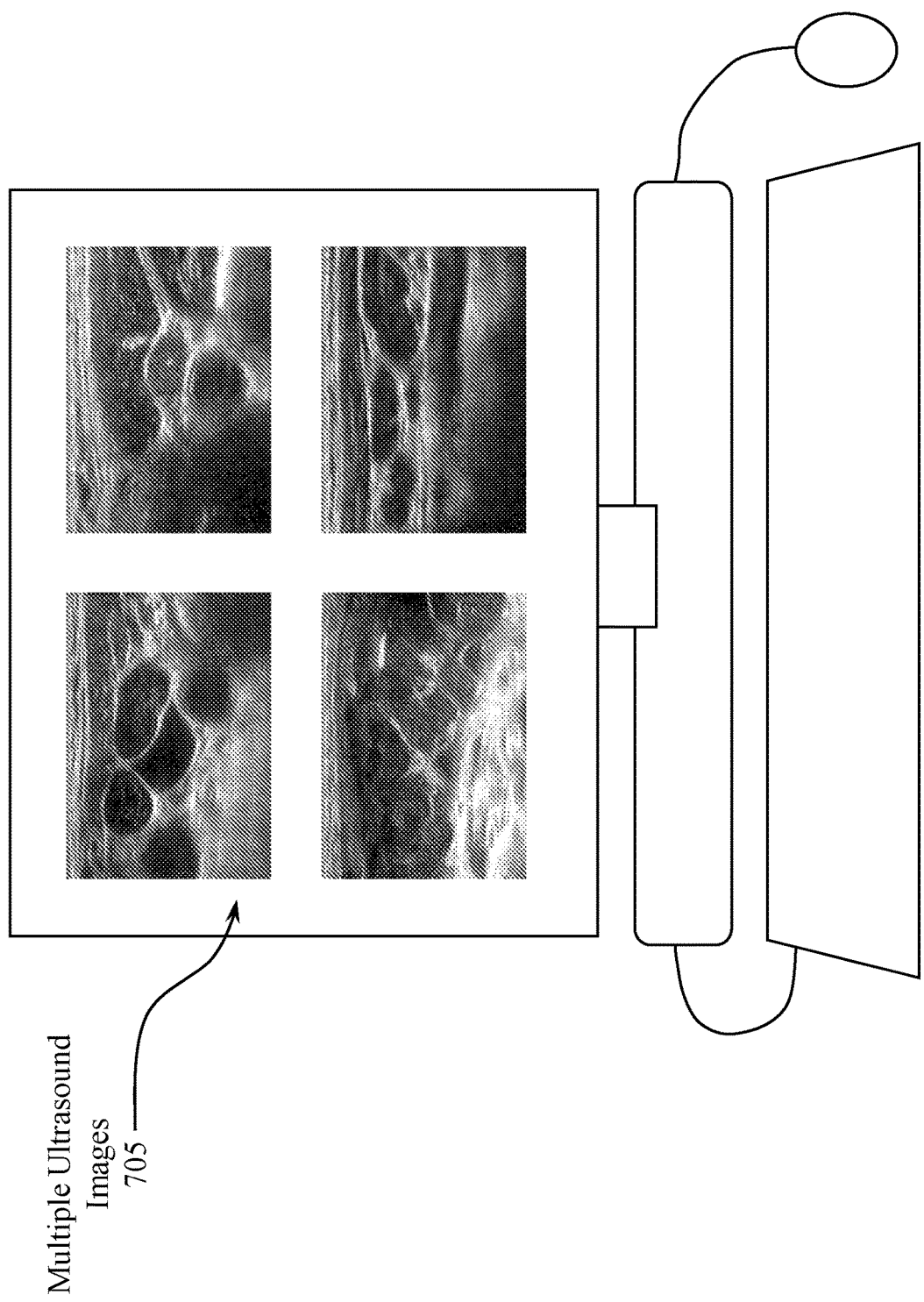
FIG. 7 displays multiple lymph node ultrasound images.

For example, FIG. 6 shows an ultrasound image 605 of a group of tissues (e.g., lymph nodes 610 and other tissues 615 that are not lymph nodes, to be discussed in more detail later). This ultrasound image 605 was captured using an ultrasound device. Here, it will be appreciated that the ultrasound image 605 is comprised of an array of pixels (e.g., similar to the array of pixels 310 of FIG. 3). Accordingly, the ultrasound's array of pixels includes (1) pixels that correspond to lymph nodes 610 and (2) pixels that correspond to tissues 615 that are not lymph nodes. This ultrasound image 605 is displayed on a user interface of a computer system (e.g., the computer system 100 of FIG. 1). Relatedly, the ultrasound device that was used to capture the ultrasound image 605 may be included as one of the sensors 130 or 140 shown in FIG. 1. While FIG. 6 shows an instance where the user interface is displaying a single ultrasound image 605, FIG. 7 shows an instance where multiple ultrasound images 705 are visually displayed simultaneously with each other.

To provide some background, an ultrasound device is a widely used device for imaging lymph nodes and other tissues for clinical diagnosis. Indeed, ultrasound imaging is a common first-line imaging device used during patient examinations for those patients who have certain kinds of medical issues (e.g., neck lumps). An ultrasound device is often used first because it is non-invasive and readily available in most hospitals.

The remaining portion of this disclosure will focus on lymph nodes. It will be appreciated, however, that the disclosed embodiments are able to operate with any kind of tissue and not just lymph nodes. For brevity, however, only lymph nodes will be discussed hereinafter.

Quantitative analysis of lymph nodes' size, shape, morphology, and their relations in an ultrasound image provides useful and reliable information for clinical diagnosis, cancer staging, patient prognosis, and treatment planning. It also helps obtain a better understanding of what are solid and effective features for diagnosing lymph node related diseases.

Returning to FIG. 6, the ultrasound image 605 shows various different tissues, including lymph nodes 610 and tissues 615 that are not lymph nodes. As illustrated, the tissues 615 that are not lymph nodes are somewhat similar in visual appearance to the lymph nodes 610. Because of this similarity, it may be difficult for a medical practitioner to accurately distinguish between the lymph nodes 610 and the tissues 615 that are not lymph nodes. Accordingly, there is a substantial need to provide an automatic method for segmenting lymph nodes in an ultrasound image.

Furthermore, an ultrasound image (e.g., the ultrasound image 605) may contain multiple lymph nodes (e.g., the multiple lymph nodes labeled as lymph nodes 610). In some instances, lymph node areas in the ultrasound image may be unclear and the contour boundaries may be blurred. While some systems have been developed to perform semantic segmentation on natural images, such systems are inadequate when it comes to performing semantic segmentation on medical images because medical images are significantly more complex and less intuitive than a natural image. Furthermore, additional non-trivial difficulties arise because of the stark differences between natural images and medical images. By way of example, lymph node object areas can be in dark or bright conditions, and non-lymph node objects (e.g., blood vessels and background tissue) can also contain dark or bright areas. As a result, using only pixel-level intensity will not ensure satisfactory segmentation results. Accordingly, existing techniques for semantic segmentation are deficient when it comes to segmenting a medical image because those techniques either (1) have no detection part and require manual delineation of the detection methods (e.g., based on intensity level) or (2) are too simple to give accurate results. The disclosed embodiments provide significant advantages because they provide accurate segmentation results in medical images.

Example FCN Architectures

A fully convolutional network (FCN) is a window-based method for performing semantic segmentation. According to the disclosed embodiments, a "coarse-to-fine" stacked FCN model is provided. This model is structured to incrementally learn segmentation knowledge from a non-expert level to an expert level for tissue (e.g., lymph node) segmentation. As discussed earlier, a computer system is trained to recognize image objects. According to the principles disclosed herein, the embodiments recognize image objects in a coarse-to-fine approach, which will be discussed in more detail momentarily.

A FCN module is a deep learning model that mainly contains "convolutional layers" and does not contain any "fully connected layers" which is in contrast to a "convolutional neural network" (aka a CNN). Each FCN module is able to process an image to identify objects within that image. The disclosed embodiments are able to support a stacked configuration in which multiple FCN modules are stacked, or rather staged, together. By staged, it is meant that the output of one FCN module is used as the input to another FCN module. As a result, the disclosed embodiments are configured to support any number of serially-arranged FCN modules. By stacking a number of FCN modules, the embodiments are able to realize a much more accurate understanding of the objects included within an image.

For semantic segmentation on a 2D image (e.g., the ultrasound image 605 of FIG. 6), the input to a FCN module will be a n×m×c tensor, where n is the pixel length of the image, m is the pixel width of the image, and c is the number of channels, as generally discussed earlier. The output of that FCN module will be a n×m×s tensor, where s is the number of object classes that were identified by the FCN module. Using FIG. 3 as an example, the FCN module might determine that s is equal to 3 because there is a vase object, a table object, and a background object.

In a different example, for a pixel with coordinates (x, y), if that pixel belongs to object class 1 (as determined by the ground truth understanding of the digital image), then (x, y, l) in the output tensor should have a very large probability value (close to 1), meaning that if the FCN module accurately segmented that pixel, then the FCN module should have a high level of confidence for that class. Similarly, that pixel will have a very low probability value for the other object classes. To illustrate, for that same pixel (x, y, i), but where i=2, . . . , s, then the resulting probability values should all be quite low (close to 0). As a result, a single pixel may have multiple probability values associated to it, one probability value for each of the identified object classes. Accordingly, each pixel is given a probability metric, or value, which value indicates a level of confidence that the FCN module has in its classifying that pixel as belonging to a particular object class.

In some embodiments, objects (i.e. groups of pixels) that have been segmented into a first object class/set will have associated therewith a similarity probability that satisfies a first threshold level. In this context, the first threshold level indicates that the FCN module is sufficiently confident in its classification of that pixel. If the probability is below that first threshold level, then the FCN module is not sufficiently confident. By way of example and not limitation, supposed the FCN module determines that a pixel must have a probability value of at least 65% to be accurately categorized as belonging to a particular class. Now, suppose there are three object classes within an image. Further, suppose that the pixel is assigned a probability of 33% for object class A, 33% for object class B, and 34% for object class C. Here, none of the probabilities satisfy the 65% threshold value. As a result, it can be determined that the FCN module is not sufficiently confident in labeling that pixel as belonging to a particular object class.

As another example, consider lymph node objects and other tissue objects. Some of the other tissue objects may appear to be visually similar to a lymph node. For this first threshold value, the FCN module may determine that if an object has a 60% probability of being a lymph node, then it satisfies the first threshold level and may be initially categorized as a lymph node. Accordingly, this first threshold level acts as an initial gate in classifying objects as lymph nodes.

As such, the first threshold level may be set so as to differentiate between objects that are visually similar to lymph nodes and objects that are not visually similar to lymph nodes. In at least one embodiment, the first threshold level is used as an initial filter for distinguishing between tissues that are visually similar to lymph nodes and tissues that are not visually similar. In this manner, if a pixel is given a probability value that satisfies the first threshold level, then the FCN module is at least somewhat confident that the pixel corresponds to a lymph node. Of note, the first threshold level is simply a minimum confidence level. As a result, some false positives may be present, as discussed above.

In this manner, the similarity probability is based on an estimated similarity in visual appearance between each of the objects in the first class/set and an identifiable lymph node. Such a first threshold value may be used during a first stage FCN module. In other words, after a first FCN module processes the digital image, the FCN module may use this first threshold value to distinguish between objects that appear to be similar to lymph nodes and objects that are not visually similar to lymph nodes.

For subsequent FCN stages, a second threshold level may be used. For example, a second stage FCN module may classify objects into a second class/set. Here, these second class/set objects all have a similarity probability that satisfies the second threshold level, which is stricter than the first threshold level. To clarify, the second threshold level indicates that the FCN module is confident that those objects are actually lymph nodes and not just objects that appear to be visually similar to lymph nodes. By way of example and not limitation, the second threshold level may be set to 90% (whereas the first threshold level was set at 60%). After processing the image data through the second FCN module, the model will have a better understanding of the objects that are in the digital image. During the pass through the first FCN module, the segmentation was a "coarse" segmentation, during subsequent passes through FCN modules, the segmentation becomes a better, or rather "fine," segmentation.

In this manner, objects may be accurately segmented into lymph nodes and non-lymph nodes. Accordingly, the above discussion illustrates how each pixel is assigned a likelihood of belonging to a particular object class.

After the image data is processed through a first FCN module, the first FCN module generates an "intermediate" segmentation label map. Similar to the above discussion, this "intermediate" segmentation label map is coarse because it may contain one or more false positives (i.e. objects that were classified as lymph nodes even though they are not actually lymph nodes). After the image data is passed through one or more subsequent FCN modules, a final segmentation label map will be produced. This final segmentation label map is a "fine" segmentation label map because it has an expert-level understanding of the image data.

Accordingly, in some of the disclosed embodiments, there are at least two object classes/sets for the intermediate segmentation label map. The first class includes objects that are visually similar to lymph nodes while the second class includes objects that are not visually similar to lymph nodes. Relatedly, the final segmentation label map also includes at least two object classes, namely, objects that are real lymph nodes and objects that are other types of tissues and/or background images.

Figure 8:
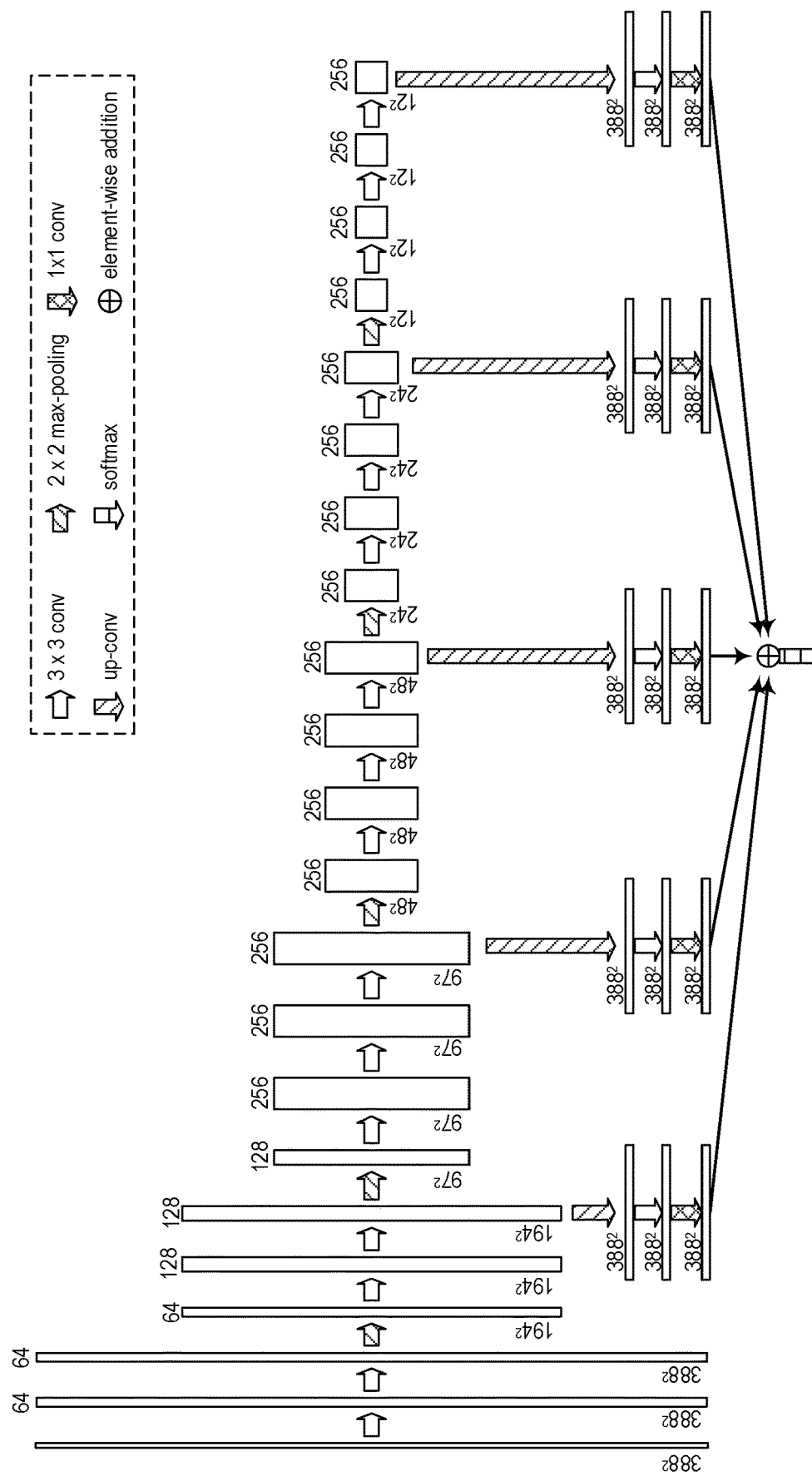
FIG. 8 illustrates an example of a fully convolutional network architecture.

Turning now to FIG. 8, this Figure shows an example of a U-Net FCN module architecture. The depicted U-Net is a FCN model for biomedical imaging tasks. In particular, the depicted U-Net can systematically combine fine imaging details with middle-level and object-level information for accurate object detection and segmentation in biomedical images. As shown in FIG. 8, an input image of dimension 388×388 is entered in the FCN module. It will be appreciated, however, that the input image may be of any size. Accordingly, 388×388 is simply an example size. The numbers near the top of each vertical box (e.g., 64, 128, and 256) illustrate the number of feature channels that are currently present. The horizontal arrows illustrate that a 3×3 convolution function is performed on that image. The horizontal arrows (with right inclined lines) illustrate that a 2×2 max pooling function is performed. The vertical arrows (with left inclined lines) illustrate that an up-convolution function is performed while the vertical arrows (with crossed lines) illustrate that a 1×1 convolution function is performed. The arrow labeling scheme is visible in the legend.

Making the model deeper (i.e. adding more max-pooling layers) can help the model capture larger-scale object-level information. As shown in FIG. 8, one max-pooling operation reduces the image size to ¼ of its original size (e.g., a 388×388 image is reduced to a 194×194 image, which is ¼ of the size of the 388×388 image). Such a process allows the corresponding masks in the convolutional layers to work on a larger "view" in the image domain. This operation is beneficial for the model because it enables the model to capture part-object-level and whole-object-level image cues.

By fusing (i.e. the element-wise addition function shown in FIG. 8) the segmentation results (which have been up-convoluted from different scales), a more accurate lymph node segmentation may be realized. Because lymph node sizes can vary considerably, fusing the output from different scales helps the final results accurately capture lymph nodes of different sizes. Here, it is worthwhile to note that the disclosed embodiments do not require the use of auxiliary classifiers on the output that is up-convoluted.

Figure 9:
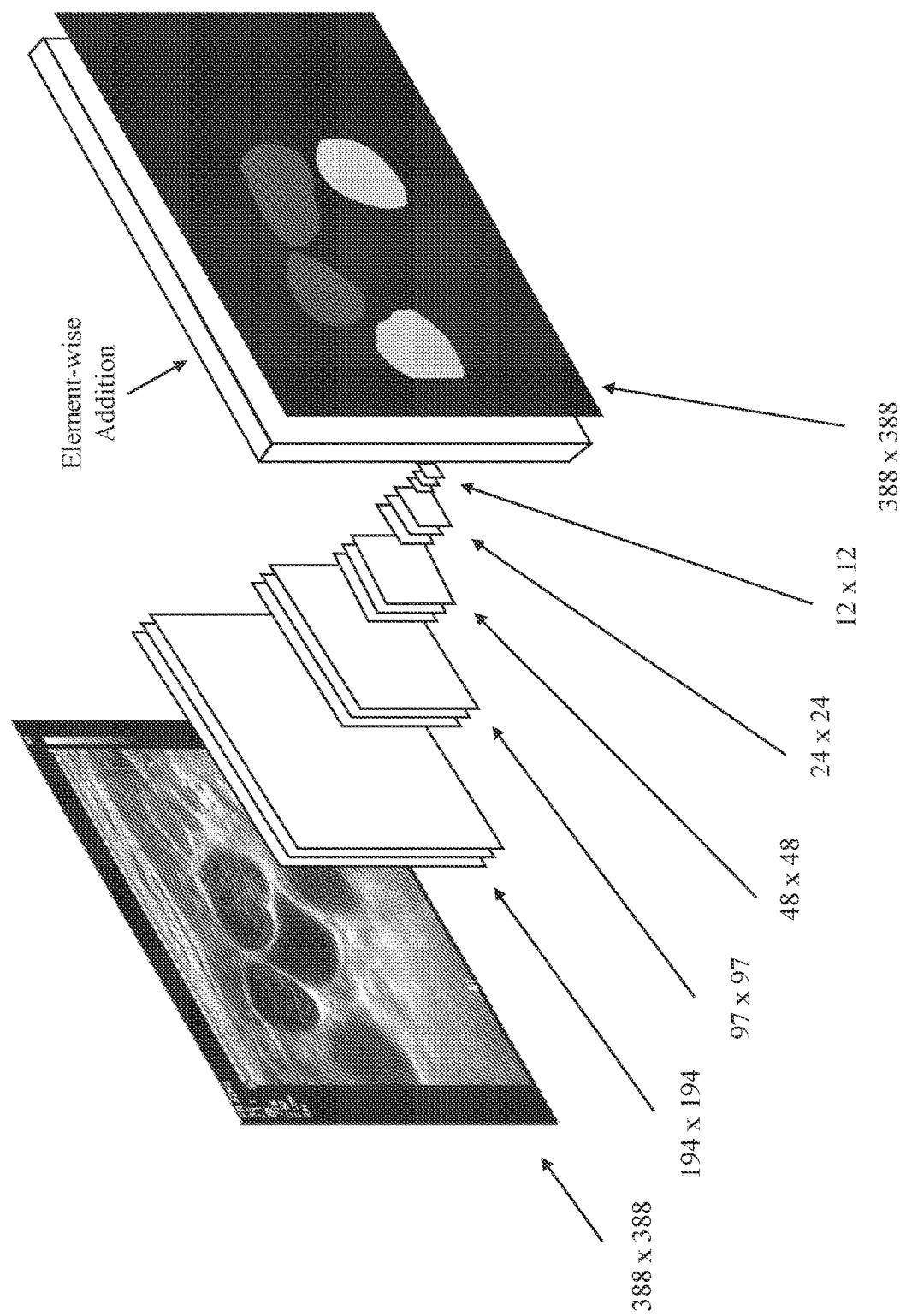
FIG. 9 illustrates an example of a fully convolutional network architecture that is processing an ultrasound image.

Accordingly, each of the FCN modules (i.e. each FCN stage) may be designed in the manner presented in FIG. 8. FIG. 9 shows another high-level overview of this example architecture. FIG. 9 includes some additional detail in that an ultrasound image and a resulting segmentation label map are illustrated. Additionally, the sizing that results from each max-pooling operation is shown.

Figure 10:
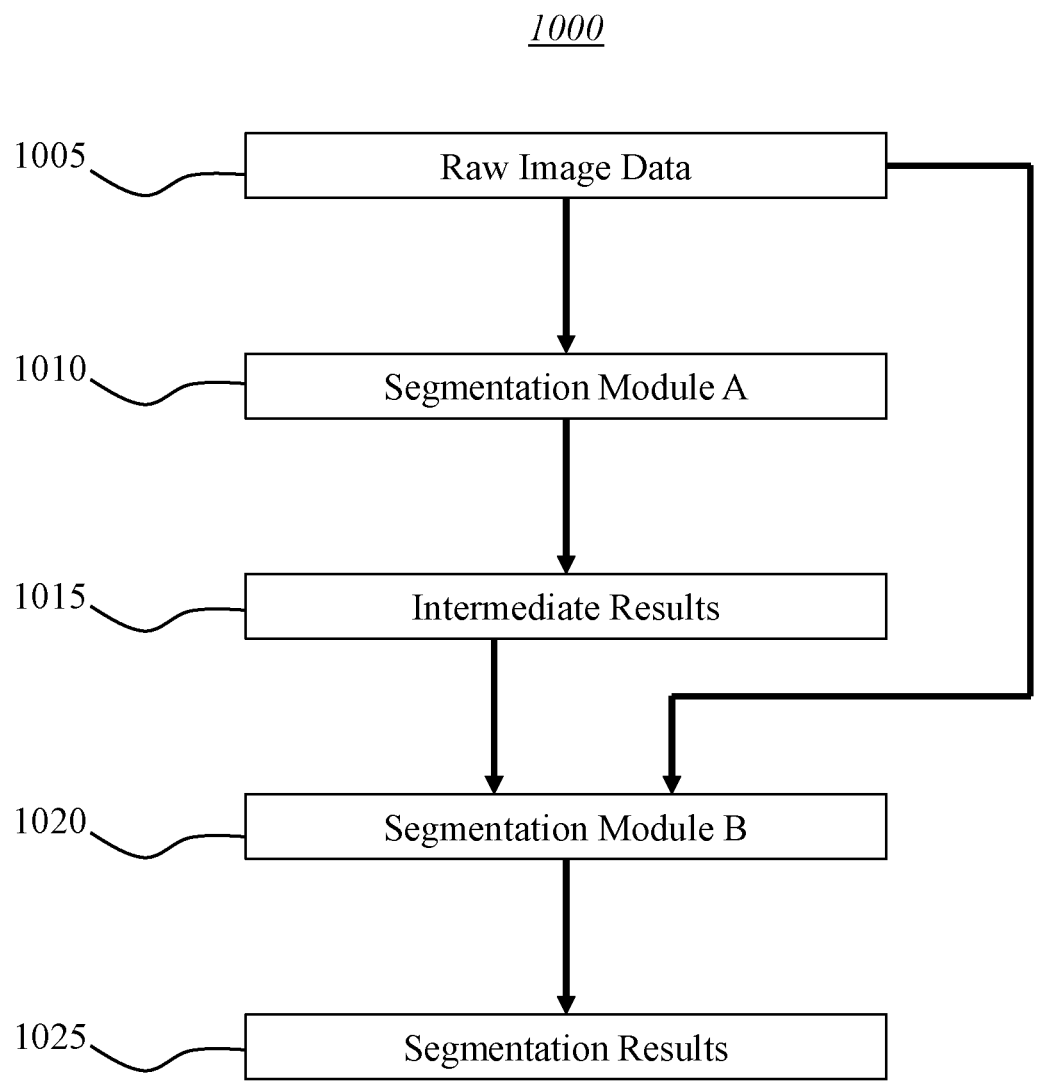
FIG. 10 shows a high-level flow chart illustrating a process for segmenting tissue objects from an ultrasound image.
Figure 11:
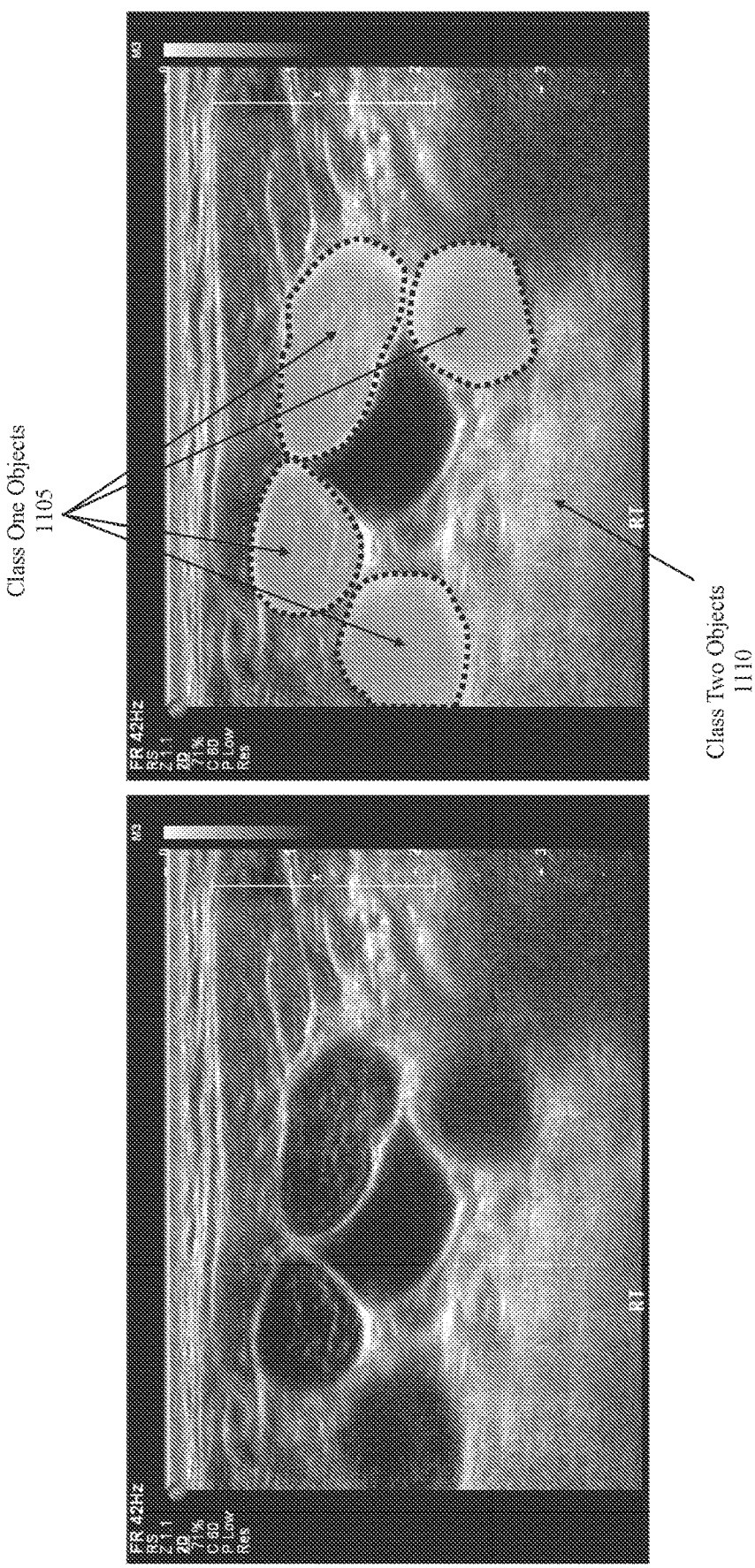
FIGS. 11A and 11B illustrate a medical image being processed through a first stage fully convolutional network.

Turning now to FIG. 10, FIG. 10 illustrates a high-level flowchart for performing semantic segmentation using a multi-staged FCN module approach. Here, it will be appreciated that this multi-staged FCN module approach is a coarse-to-fine process.

Initially, as shown in FIG. 10, the process includes a step 1005 of receiving raw image data (e.g., the ultrasound image 605 of FIG. 6). This raw image data is provided as input to segmentation module A at step 1010. Here, the segmentation module A is a FCN module configured in the manner illustrated in FIG. 8. Segmentation module A takes the raw image data and produces an intermediate segmentation result, as shown in step 1015. This intermediate segmentation result distinguishes tissue objects that are visually similar to lymph nodes from tissue objects that are not visually similar to lymph nodes. Here, it will be appreciated that the intermediate segmentation label map is considered to be a "coarse" label map because the intermediate segmentation label map may include one or more false positives.

This intermediate segmentation result is then fed into a second segmentation module (i.e. segmentation module B) at step 1020. In addition to the intermediate segmentation result, the raw image data is also fed as input into the segmentation module B. Here, the raw image data acts as a base reference for the segmentation module B. The segmentation module B then produces a final segmentation result at step 1025. This final segmentation result accurately identifies all lymph nodes and distinguishes those lymph nodes from all other tissues, even tissues that appear to be visually similar to a lymph node. Accordingly, because the final segmentation result (i.e. the final segmentation label map) includes an accurate identification of the lymph nodes, this final segmentation label map is considered to be a "fine" label map. As a result, the disclosed segmentation process is a coarse-to-fine segmentation process.

Accordingly, as can be seen in FIG. 10, some of the disclosed embodiments consist of multiple stages of FCN modules (i.e. the segmentation modules). As discussed earlier, the FCN modules are trained so as to recognize tissue objects. One reason why medical image processing is significantly more difficult than natural image processing is because of the limited number of available training samples. Whereas there is a countless number of natural images for training purposes (e.g., there is a countless number of dog images available to train a computer to recognize a dog), there are significantly fewer medical images for training purposes. Even further, the number of qualified individuals to provide the training for the computer is limited. As a result, performing semantic segmentation on medical images is significantly more difficult than performing semantic segmentation on natural images.

Accordingly, segmentation module A is trained to learn segmentation knowledge from the raw input image to produce a segmentation label map (an intermediate result) that shows all the areas that are visually similar to lymph nodes. Here, it will be appreciated that this intermediate result is based on non-expert knowledge and may include false positives. In contrast to segmentation module A, segmentation module B is trained to use the intermediate result combined with the raw image to produce the final (i.e. expert-level) lymph node segmentation label map.

Up to this point, the disclosure has focused on embodiments that use two stages (as shown in FIG. 10). It will be appreciated, however, that other embodiments include additional stages. For example, some embodiments include three stages in which three FCN modules are used. Other embodiments include four stages in which four FCN modules are used. Accordingly, it will be appreciated that the disclosed embodiments may include any number of stages (e.g., 2, 3, 4, 5, 6, 7, 8, 9, 10, or more). In at least one embodiment, by multiple stages, it is meant that there are multiple stacked FCNs, where each FCN receives input and produces output so as to produce a semantically segmented image.

Additionally, the disclosed embodiments are able to perform a post-processing method. This post-processing will be discussed in much more detail later on. However, by way of a brief introduction, the post-processing step includes the implementation of a convex-shape constraint based graph search method to improve the lymph node contour boundaries. This post-processing significantly improves the accuracy of the final lymph node segmentation label map.

As discussed earlier, the FCN modules are trained to recognize lymph nodes and other tissues. In this manner, some of the disclosed embodiments make use of a multi-stage incremental learning concept for designing deep learning models. Based on this concept, the deep learning model learns how to perform semantic segmentation in a coarse-to-fine, simple-to-complex manner. Furthermore, some of the disclosed embodiments use a stacked FCN model with the guidance of the coarse-to-fine segmentation label maps (i.e. the intermediate segmentation label map and the final segmentation label map).

Returning to FIG. 8, this U-Net FCN module architecture is a small-sized FCN that is used to build the FCN modules for some of the disclosed embodiments. It will be appreciated, however, that other FCN architectures may be used. In each learning stage, the model is kept relatively simple so as to avoid over-fitting in each learning stage. Since the label maps are designed in an incremental manner (i.e. coarse-to-fine), any risk of over-fitting for the whole model is greatly reduced.

With regard to training the FCN modules, a non-expert is permitted to train the first FCN module (i.e. segmentation module A in FIG. 10). Here, the non-expert identifies all possible lymph node areas in a set of digital images. The intermediate segmentation label map is expected to then cover all true lymph nodes and may contain one or more false positives. The intermediate segmentation label map is used to guide the training of segmentation module A. For segmentation module B, the resulting segmentation label map shows the real lymph node areas and can be marked by an experienced sonographer. As such, in at least one embodiment, an expert sonographer can train the segmentation module B. In situations where the intermediate segmentation label map misses some real lymph nodes, the disclosed embodiments are able to generate subsequent intermediate segmentation label maps by combining previous segmentation label maps with a final segmentation label map. Furthermore, the FCN modules are able to use the original ultrasound image as a base reference.

The disclosed embodiments provide significant advantages in that they improve the training process when training the FCN modules. Accordingly, the following disclosure presents some of the methods for training FCN modules.

For example, in some training situations, a stochastic gradient descent based method (e.g., Adam or RMSProp) may be applied to train the modules. In some instances, all of the FCN modules are trained at the same time using the same image data. Here, each FCN module influences all of the other FCN modules. In a different scenario, the first FCN module is trained using only intermediate segmentation label maps while subsequent FCN modules are trained using only final segmentation label maps. Here, the intermediate segmentation label maps influence the subsequent FCN modules but the final segmentation label maps and the subsequent FCN modules do not influence the first FCN module. In yet another training scenario, the first FCN module may be trained using intermediate segmentation label maps. Then, the first FCN module is fixed and the subsequent FCN modules are trained. In this context, the first FCN module influences the subsequent FCN modules, but not vice versa. Different from the earlier training scenario, in this scenario the influence from the first FCN module to the subsequent FCN modules remains the same for the same image samples in different situations.

FCN Module Results

Figure 12:
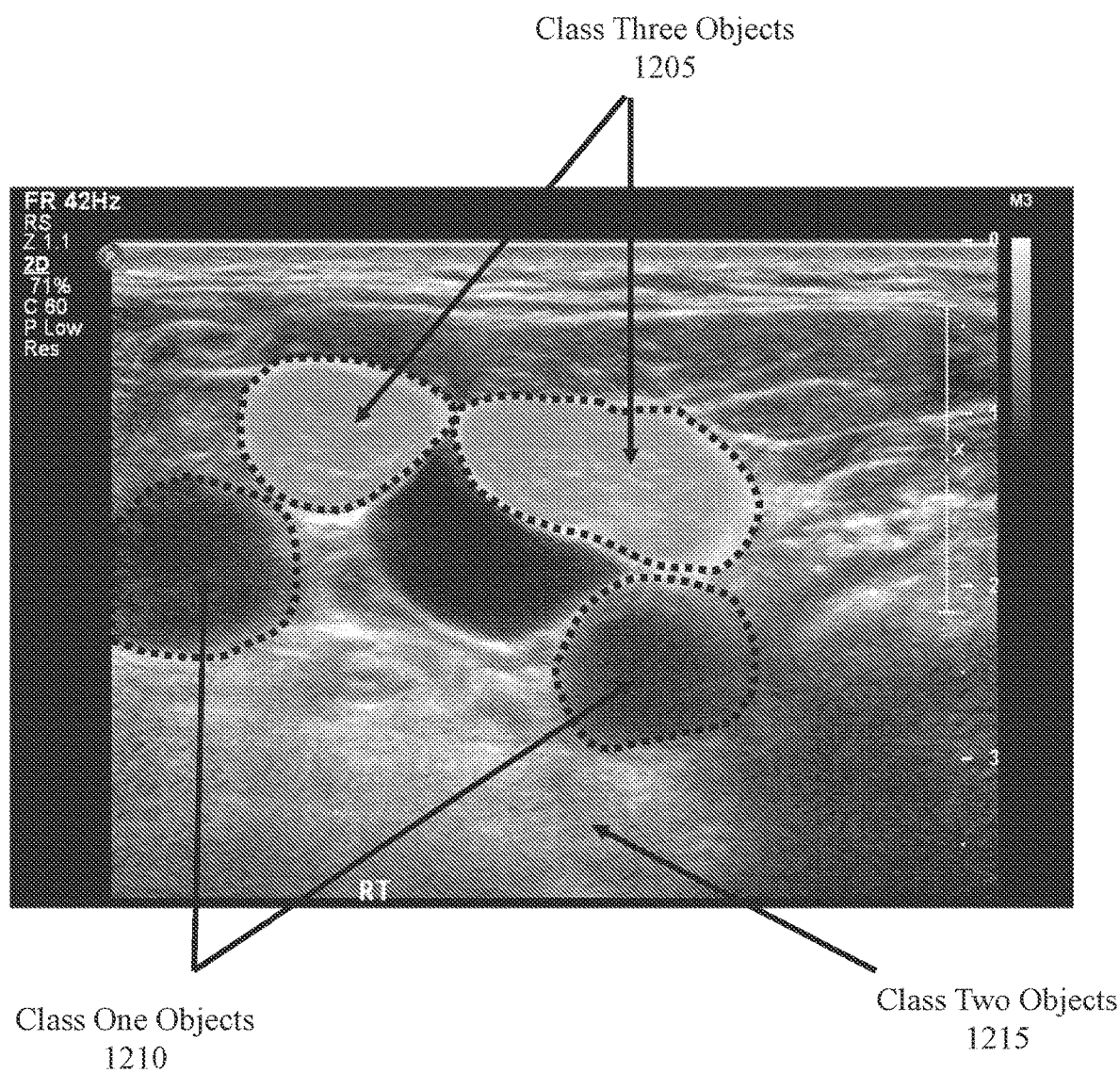
FIG. 12 illustrates a medical image being processed through a second stage fully convolutional network module.

Attention will now be directed to FIGS. 11A, 11B, and 12, which Figures illustrate a practical example in which some of the disclosed embodiments are realized.

FIG. 11A illustrates an example ultrasound image, which ultrasound image is analogous to the ultrasound images presented in FIGS. 6 and 7. Here, the ultrasound image includes various different objects, some of which correspond to lymph nodes and some of which do not correspond to lymph nodes. In at least one embodiment, the computer system receives this ultrasound image and feeds it as input into a FCN module.

FIG. 11B shows a resulting intermediate segmentation label map. In this scenario, the intermediate segmentation label map is designed to overlap, or "mask," the original ultrasound image. As illustrated, the intermediate segmentation label map includes objects that have been segmented into various different object classes/sets. In particular, objects have been segmented into class one objects 1105 and class two objects 1110. The objects included as part of the class one objects 1105 are objects that are determined to be visually similar to actual lymph nodes. As discussed earlier, the intermediate segmentation label map may include objects that appear to be visually similar to lymph nodes but that are not actual lymph nodes. In contrast to the class one objects 1105, objects that are segmented as class two objects 1110 are objects that do not have a visual appearance similar to a lymph node.

In the scenario presented in FIG. 11B, the class one objects 1105 have been emphasized so as to be distinguishable from the class two objects 1110. In particular, the class one objects 1105 have been enshrouded with a partially transparent mask and provided with a definitive contour border. In contrast to the class one objects 1105, all the other objects (i.e. the class two objects 1110) have no such emphasis. Accordingly, from this disclosure, it will be appreciated that different object classes may be visually emphasized in different manners. For example, objects that are segmented into a first object class may be visually emphasized using a first format while objects that are segmented into a second object class may be visually emphasized using a second format. The formatting may be any type of formatting. By way of example and not limitation, the formatting includes highlighting the objects, creating a border around the objects, placing a semi-transparent mask on top of the objects, or any other process for distinguishing one object from another.

Accordingly, FIG. 11B illustrates an example intermediate segmentation label map. Turning now to FIG. 12, FIG. 12 illustrates a final segmentation label map. According to the principles discussed herein, the intermediate segmentation label map and the original ultrasound image are both fed into another FCN module. Here, this process constitutes a second stage. The second FCN module will then process the images and produce a final segmentation label map, which is illustrated in FIG. 12.

As illustrated, the final segmentation label map includes class one objects 1210, class two objects 1215, and class three objects 1205. Here, the class two objects 1215 are analogous to the class two objects 1110 of FIG. 11 in that all objects that were segmented into the class two objects 1215 are objects that do not have a visual appearance similar to a lymph node. Here, it is worthwhile to note that some embodiments do not perform any additional analysis on class two objects after being segmented as such in the intermediate segmentation label map. To clarify, if an object is initially labeled as a class two object when the original ultrasound image is passed through the first FCN module, then some embodiments do not further analyze those objects during subsequent passes through a FCN module. Other embodiments, however, are configured to verify the results of the initial segmentation process. For example, some embodiments, during subsequent passes through a FCN module (i.e. during later stage processing), perform verification checks to ensure that an object was not improperly labeled as "not a lymph node" when it actually was a lymph node. Accordingly, some embodiments perform verification processing.

Returning to FIG. 12, FIG. 12 shows class one objects 1210 and class three objects 1205. As illustrated, both the class one objects 1210 and the class three objects 1205 were previously included as a part of the class one objects 1105 shown in FIG. 11B. After passing through a subsequent FCN module, however, the class one objects 1105 of FIG. 11 were further processed to accurately segment objects that are actual lymph nodes (i.e. class three objects 1205) from objects that do appear to be visually similar to a lymph node but that actually are not lymph nodes (i.e. class one objects 1210). Accordingly, by using multiple stages of FCN modules, the disclosed embodiments provide a coarse-to-fine segmentation process for accurately identifying actual lymph nodes and for identifying objects that are visually similar to lymph nodes but that are not actual lymph nodes.

Similar to the intermediate segmentation label map of FIG. 11B, the final segmentation label map also includes different formatting for the different classes of objects. For instance, the class three objects 1205 are visualized in a format that is different than a format of the class one objects 1210. Further, the formats of the class three objects 1205 and the class one objects 1210 are different than the format of the class two objects 1215. In particular, the mask that has been applied over the original ultrasound image uses different formatting for the various different object classes.

Post Processing to Improve Contour Boundaries

Figure 13:
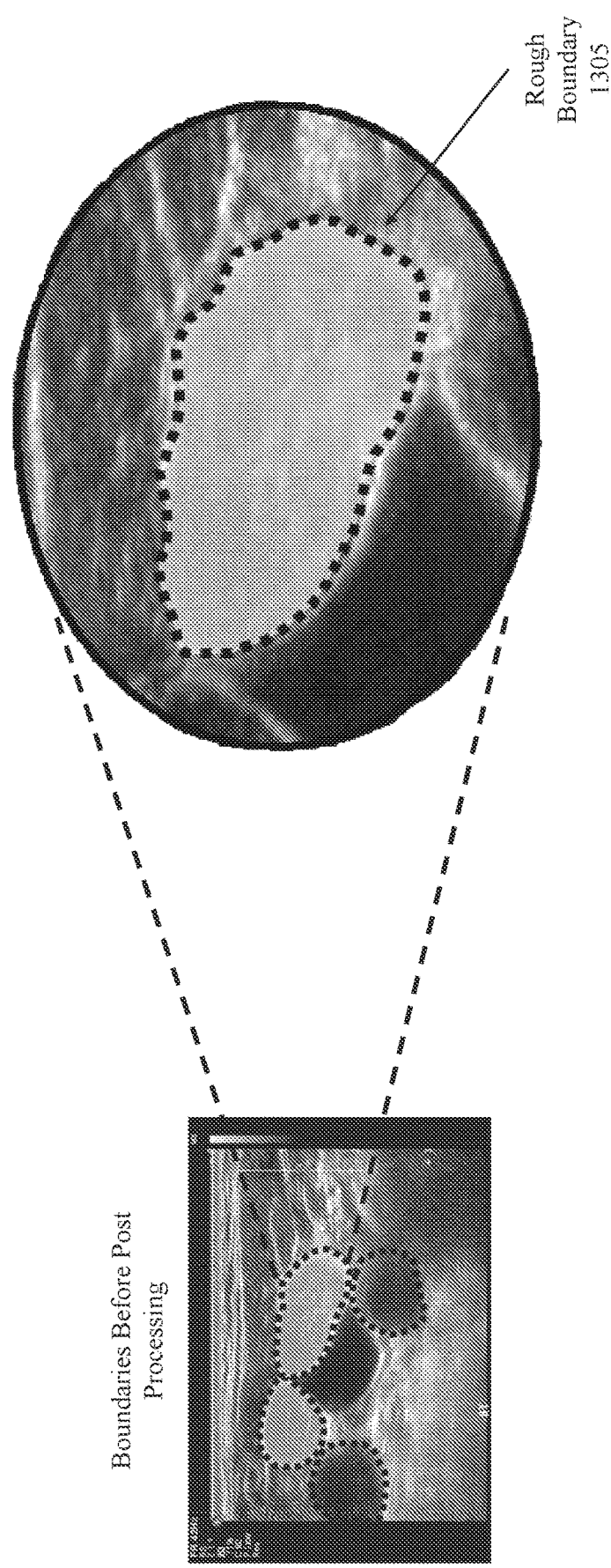
FIG. 13 illustrates a post-processing procedure for improving contour boundaries.
Figure 14:
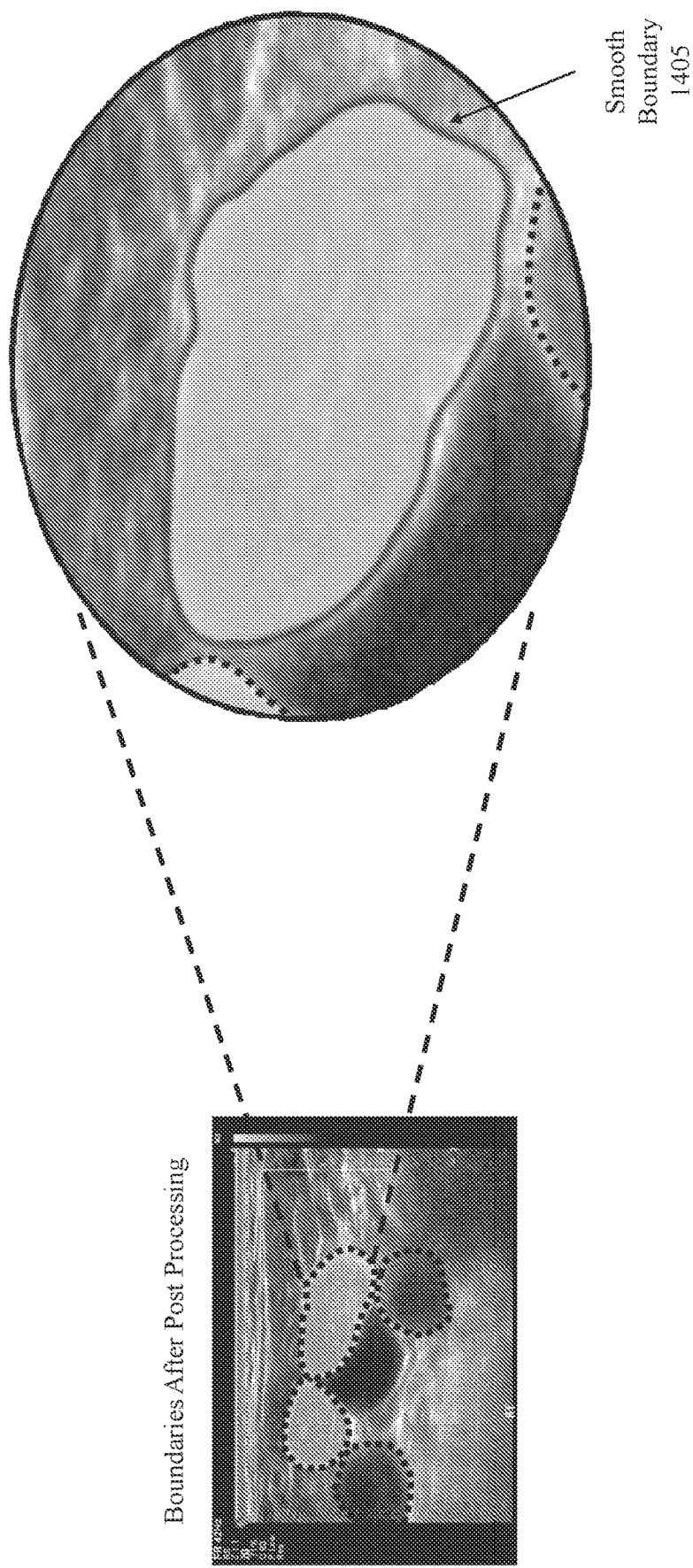
FIG. 14 illustrates a resulting contour boundary after post-processing has been performed.

Having just provided a practical example of the semantic segmentation process according to the disclosed principles, attention will now be directed to FIGS. 13 and 14, which Figures illustrate a unique process for refining the contour boundaries of a segmented lymph node object in a final segmentation label map.

FIG. 13 shows a final segmentation label map that is analogous to the final segmentation label map of FIG. 12. Additionally, FIG. 13 shows an expanded portion of one of the segmented objects that is included in the final segmentation label map. As illustrated, the contour boundary 1305 of the object is generally rough, fuzzy, or otherwise irregular. In view of this rough contour boundary 1305, the disclosed embodiments are able to apply post-processing to further refine the lymph node's contour boundaries. For instance, refining an object's contour boundary results in smoothing any irregular portions. This refinement process is based on the segmentation results of the coarse-to-fine FCN segmentation process.

As a general matter, most of the time lymph nodes have a convex shape when portrayed in an ultrasound image. Although alternative shapes are possible, it is not very common to find concave points on the contour boundary of a lymph node. In light of this phenomenon, the disclosed embodiments are configured to use a soft convex-shape constraint to refine the border contours of lymph nodes. Such a refinement process helps generate a more accurate lymph node segmentation.

This contour optimization is modeled as a shortest path problem on a graph. For instance, given a contour C for a lymph node segmented according to the principles discussed earlier, some of the embodiments uniformly sample g points on C in a clockwise manner on the input image (i.e. the original ultrasound image). For each sample point $a_j$, let $r_j$ be a ray of h pixels orthogonal to the direction of the curvature of C at $a_j$ ($r_j$ centers at $a_j \epsilon C$).

Now, denote the i-th point (pixel) on the ray $r_j$ as $p_i^j = (x_{p_i^j}, y_{p_i^j})$ in the image. To ensure the optimized output contour C' being sufficiently smooth, some embodiments apply a smoothness constraint, specified by a parameter s, namely, each $p_i^j$ is allowed to connect only to $$p_{i'}^{j+1-\lfloor \frac{j}{g} \rfloor * g}$$

along C', for any $|i'-i| \leq s$, where $i=1, 2, \ldots, h$, and $j=1, 2, \ldots, g$ (where s may be chosen to be 5 in this instance, but some other value may also be used).

Some embodiments also enforce a convexity shape constraint in that any concave edge-to-edge connection to $p_i^{j-1}p_i^{j}$ to $p_{i'}^{j}p_{i''}^{j+1}$) along C' is penalized by incurring a large connection cost. A graph G is then built on the sample points (graph nodes) of these rays with node weights reflecting inverse image gradient responses and edge weights reflecting the degrees of convexity at the internal angles of the sought contour C'. A parameter w is used to control the relative importance between the node weights and edge weights in G. Computing the optimal convex-shape constrained closed contour C' in G takes $O(s^3h^2g)$ amount of time. Using these principles, this boundary refinement process produces a cleaner and more accurate lymph node segmentation. Accordingly, some embodiments use the contour optimization algorithm to refine an object's boundary as a function of convexity.

Turning now to FIG. 14, FIG. 14 illustrates an example scenario in which the contour boundary post-processing refinement process has been performed. For example, a final segmentation label map, which is analogous to the other final segmentation label maps discussed thus far, is illustrated. Whereas previously the lymph nodes boundaries may have included fuzzy or irregular portions, the lymph node shown in FIG. 14 now has a smooth boundary 1405. Accordingly, by applying the refinement principles discussed earlier, a final segmentation label map may be further refined so that the contours of the lymph nodes are more accurate.

To this point, the disclosure has focused on embodiments that refine the contours of only final segmentation label map objects. It will be appreciated, however, that other embodiments apply the refinement process at other stages of the segmentation process. For instance, some embodiments apply refinements to the intermediate segmentation label map. Still further, other embodiments apply refinements to both the intermediate segmentation label map and the final segmentation label map. Even further, some embodiments apply refinements to every resulting segmentation label map produced during the segmentation process. By way of example and not limitation, if the segmentation process included five stages, then the refinement process may be performed five separate times. Accordingly, from this disclosure it will be appreciated that the refinement process may be performed any number of times and may be implemented at any stage throughout the segmentation process.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. The methods are implemented by one or more processors of a computer system (e.g., the computer system 100 of FIG. 1). It will be appreciated that a computer system includes one or more computer-readable hardware storage media that stores computer-executable code. This computer-executable code is executable by the one or more processors to cause the computer system to perform these methods.

Figure 15:
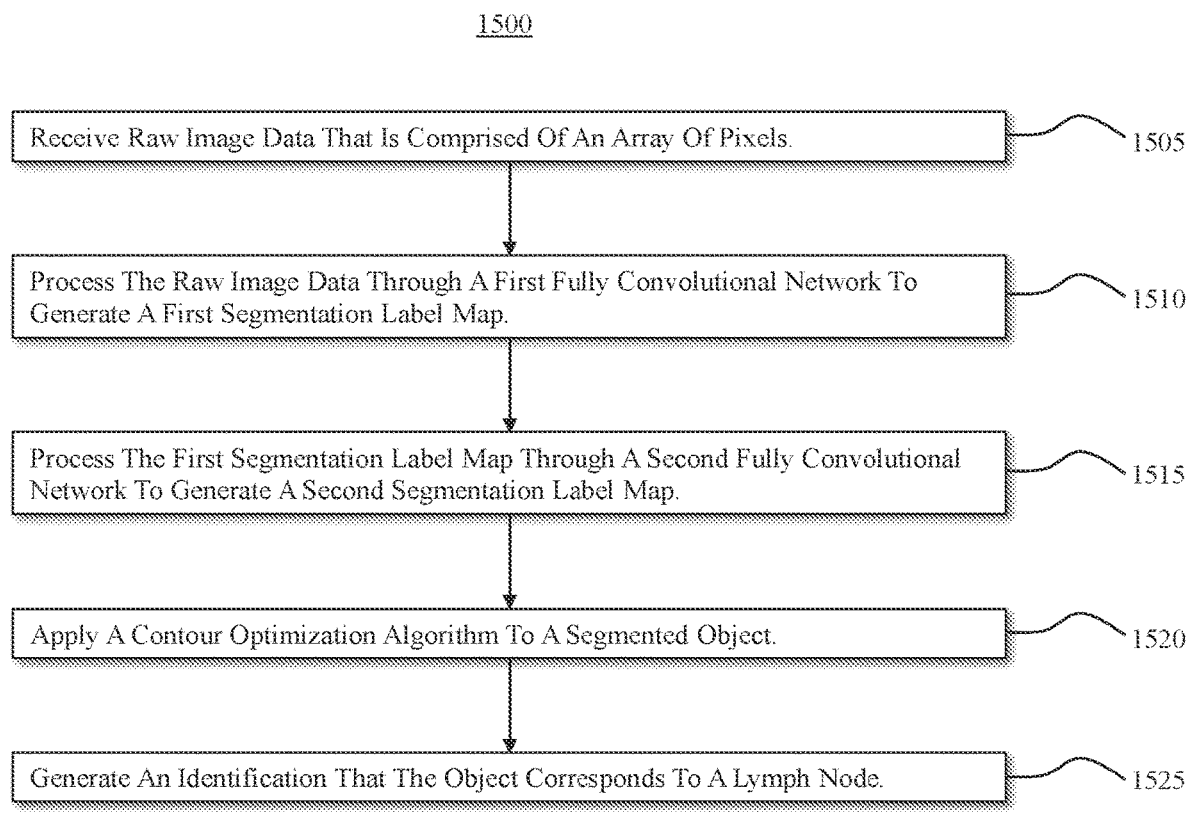
FIG. 15 illustrates an example method for performing semantic segmentation on an ultrasound image.

Turning now to FIG. 15, FIG. 15 illustrates an example method 1500 for segmenting tissue objects from an ultrasound image. Initially, method 1500 includes an act of receiving raw image data that is comprised of an array of pixels (act 1505). Here, each pixel within the array of pixels comprises ultrasound information. This act is performed by the FCN Component A 205 of the computer system 200 of FIG. 2.

Method 1500 is also shown as including an act of processing the raw image data through a first fully convolutional network to generate a first segmentation label map (act 1510). In some instances, this first segmentation label map comprises a first set of objects that have been segmented into at least a coarse segmentation class (e.g., the class one objects 1105 of FIG. 11). Additionally, in some instances, each object within the first set of objects may correspond to a group of pixels from the array of pixels. Here, this act is also performed by the FCN Component A 205.

Method 1500 also includes an act of processing the first segmentation label map through a second fully convolutional network to generate a second segmentation label map (act 1515). Here, the processing may be performed using the raw image data as a base reference (e.g., as shown in FIG. 10). Additionally, the second segmentation label map may include a second set of objects that have been segmented into a fine segmentation class (e.g., the class three objects 1205 of FIG. 12). Here, each object within the second set of objects corresponds to a group of pixels from the array of pixels. This act is performed by the FCN Component B 210 of the computer system 200 of FIG. 2.

Method 1500 also includes an act of applying a contour optimization algorithm to at least one object within the second set of objects (act 1520). As discussed earlier, this contour optimization algorithm refines a corresponding contour boundary for the object. This act is performed using the rules 220 stored in the storage shown in FIG. 2. Here, the rules 220 define the contour optimization algorithm. As a result, the segmented objects are evaluated against a specialized set of rules so as to refine the contour boundaries of the segmented objects. The post-processing component 215 performs this act using the rules 220.

Method 1500 also includes an act of generating an identification that the at least one object corresponds to a lymph node (act 1525). Here, this act is performed by the FCN Component B 210 of FIG. 2.

Figure 16:
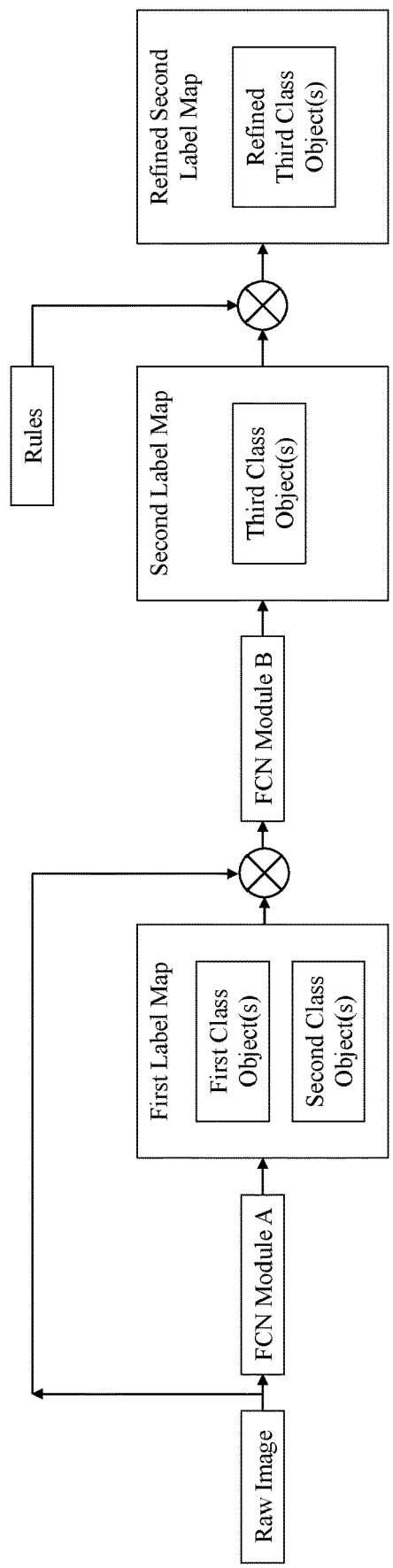
FIG. 16 illustrates another flow chart for performing semantic segmentation.

FIG. 16 shows another high-level flow chart depicting the method 1500 of FIG. 15. As illustrated, a raw image is fed as input into FCN Module A. FCN Module A then produces a first segmentation label map. In some instances, the first segmentation label map includes objects that have been segmented into a first class (i.e. objects that are visually similar to lymph nodes) and a second class (i.e. objects that are not visually similar to lymph nodes). This first segmentation label map, along with the original raw image, is then fed as input into a second FCN module (i.e. FCN Module B). Here, the original raw image acts as a base reference for the segmentation process that occurs in FCN Module B.

FCN Module B produces a second segmentation label map. Here, this second segmentation label map includes objects that have been segmented into a third class (e.g., the class three objects 1205 shown in FIG. 12). In the scenario presented in FIG. 16, the segmentation process includes only two stages. As a result, the second segmentation label map constitutes a final segmentation label map.

Next, a set of rules are evaluated against the final segmentation label map. Here, the set of rules defines a contour optimization algorithm that is evaluated against at least one of the third-class objects. This algorithm refines the contour boundaries of that object so as to remove any fuzziness or irregular portions. As a result of evaluating the set of rules against the final segmentation label map, a refined final (i.e. second) segmentation label map is produced, which map includes one or more refined elements that belong to the third class.

Having just described various example methods, the remaining disclosure will discuss various example user interfaces for displaying the resulting segmentation label maps.

Figure 17:
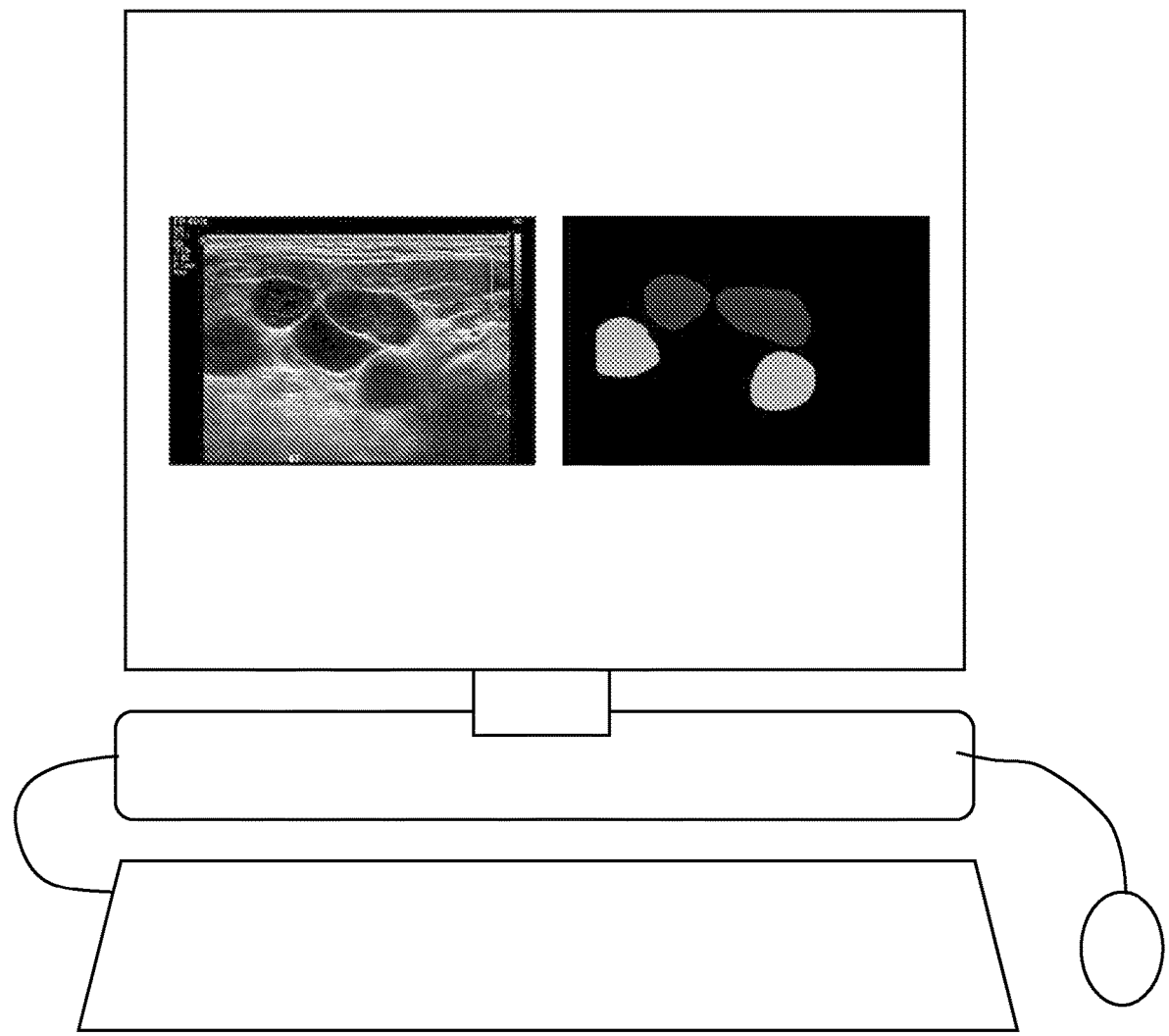
FIGS. 17, 18, and 19 illustrate various example user interfaces for displaying the results of semantically segmenting an ultrasound image.

For example, FIG. 17 shows a user interface that includes an original raw ultrasound image (i.e. the left image) and a final segmentation label map. In this context, the final segmentation label map is not overlaid, or rather is not masking, a copy of the original ultrasound image. Instead, the final segmentation label map is an independent image. Further, FIG. 17 shows that the various objects have been segmented into different object classes. As shown, there are three object classes, namely, a class formatted in black, a class formatted in light grey, and a class formatted in dark grey. The dark grey class indicates objects that are actual lymph nodes. The light grey class indicates objects that are visually similar to lymph nodes but that are not actual lymph nodes. Finally, the black objects are objects that are not visually similar to lymph nodes. As a result, a final segmentation label map may be displayed on a user interface of the computer system. As illustrated, all of the objects that have been segmented into a particular set/class are displayed using a first format while all other objects may be displayed in a different format.

Figure 18:
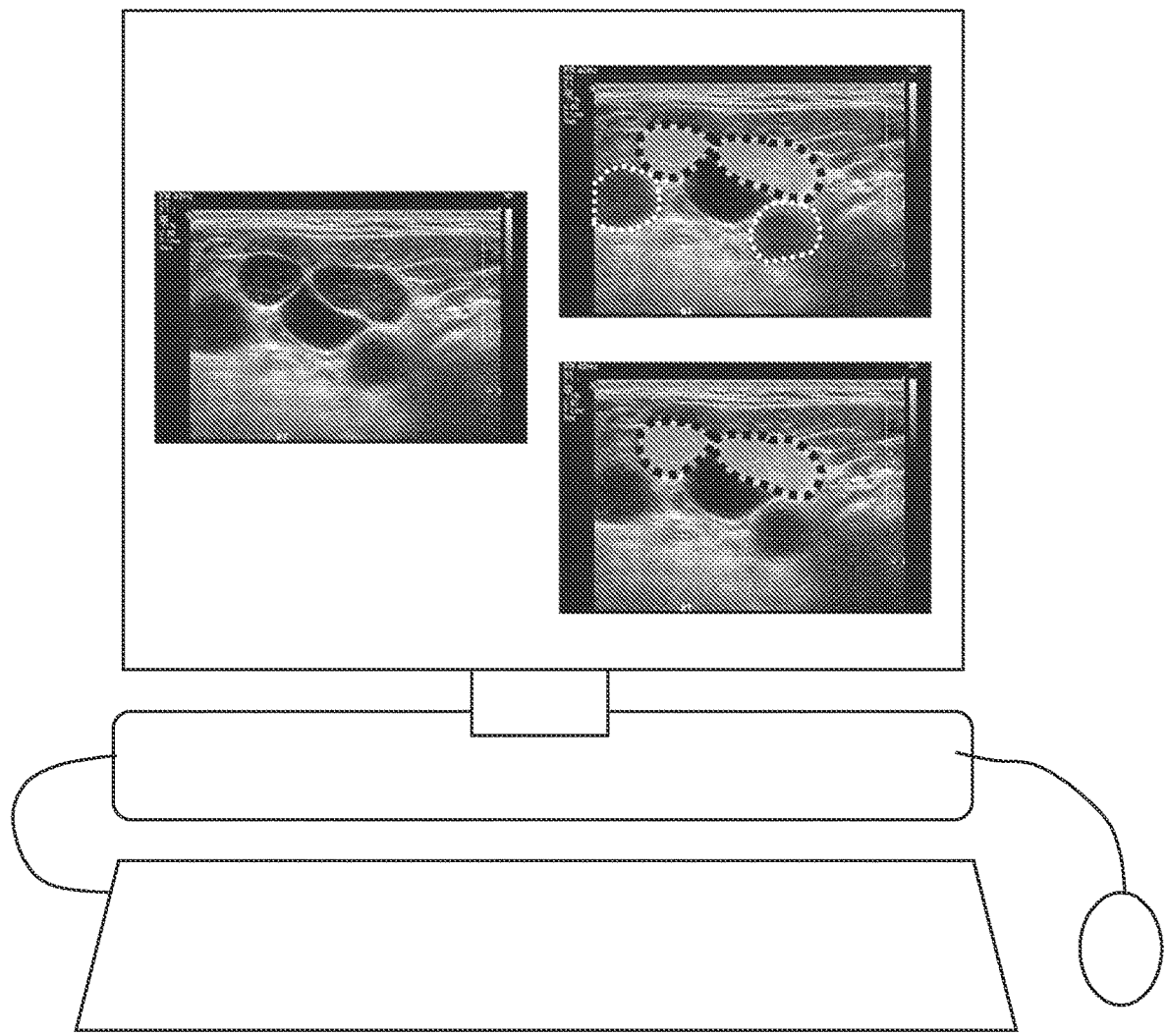

FIG. 18 shows another example user interface. Here, this user interface shows both the intermediate segmentation label map (top right map) and a final segmentation label map (bottom right map). As illustrated, the various object classes are emphasized in different manners. Accordingly, some example user interfaces include the raw image, the intermediate segmentation label map, and the final segmentation label map all displayed simultaneously with each other. In the scenario presented in FIG. 18, the intermediate and final segmentation label maps are masked on top of a copy of the original raw image. Here, the second (i.e. final) segmentation label map (bottom right) is displayed on a user interface of the computer system. Additionally, all of the objects that have been segmented into a particular set/class are displayed using a first format while all the other objects are displayed using a different format.

Figure 19:
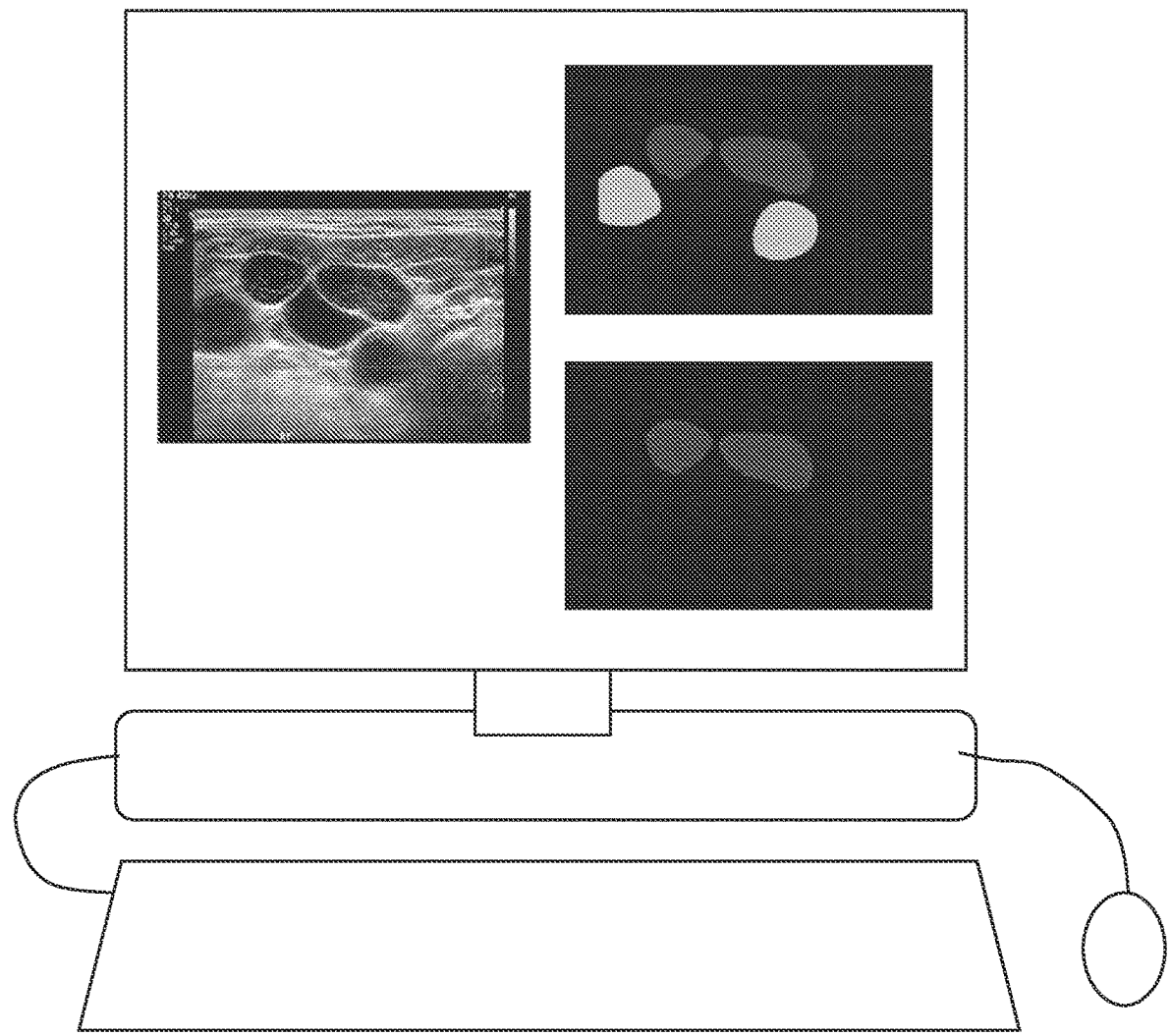

FIG. 19 shows yet another example user interface. Here, this user interface is similar to the user interface of FIG. 18 with the exception that independent images have been created for the intermediate (i.e. top right image) and final (i.e. bottom right image) segmentation label maps. To clarify, in the user interface of FIG. 19, the intermediate and final segmentation label maps are not masked on top of a copy of the original raw image. Furthermore, in this example user interface, all of the objects that are emphasized in the final segmentation label map (i.e. the bottom right image) correspond only to lymph nodes.

Accordingly, some example user interfaces are configured to display the original raw image, the intermediate segmentation label map, the final segmentation label map, or various combinations of the above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that, when executed by the one or more processors, cause the computer system to:
   receive raw image data that is comprised of an array of pixels, each pixel within the array of pixels comprising ultrasound information;

process the raw image data through a first fully convolutional network to generate a first segmentation label map, wherein:
   the first segmentation label map comprises a first set of objects that have been segmented into at least a coarse segmentation class, and
   each object within the first set of objects corresponds to a group of pixels from the array of pixels;
process the first segmentation label map through a second fully convolutional network to generate a second segmentation label map, wherein:
   processing the first segmentation label map through the second fully convolutional network is performed using the raw image data as a base reference,
   the second segmentation label map comprises a second set of objects that have been segmented into a fine segmentation class, and
   each object within the second set of objects corresponds to a group of pixels from the array of pixels;
apply a contour optimization algorithm to at least one object within the second set of objects, wherein the contour optimization algorithm refines a corresponding contour boundary for the at least one object; and
generate an identification that the at least one object corresponds to a lymph node.

2. The computer system of claim 1, wherein the array of pixels includes (1) pixels that correspond to a lymph node and (2) pixels that correspond to tissues that are not lymph nodes.

3. The computer system of claim 2, wherein objects within the first set have associated therewith a similarity probability that satisfies a first threshold level, the similarity probability being based on an estimated similarity in visual appearance between each of the objects in the first set and an identifiable lymph node.

4. The computer system of claim 3, wherein objects within the second set are objects whose similarity probability satisfies a second threshold level, the second threshold level being stricter than the first threshold level.

5. The computer system of claim 1, wherein the contour optimization algorithm refines the corresponding contour boundary for the at least one object as a function of convexity.

6. The computer system of claim 1, wherein the array of pixels defines (1) an image length of the raw image data, (2) an image width of the raw image data, and (3) a number of color channels that are included in the raw image data.

7. The computer system of claim 6, wherein the number of color channels is 1.

8. The computer system of claim 1, wherein the first segmentation label map is displayed on a user interface of the computer system, and wherein all of the objects in the first set are displayed using a first format while all other objects are displayed using a different format.

9. The computer system of claim 1, wherein the second segmentation label map is displayed on a user interface of the computer system, and wherein all of the objects in the second set are displayed using a first format while all other objects are displayed using a different format.

10. The computer system of claim 1, wherein the first segmentation label map and the second segmentation label map are displayed simultaneously with each other on a user interface of the computer system.

11. One or more hardware storage devices having stored thereon computer-executable instructions that, when executed by one or more processors of a computer system, cause the computer system to:
   receive raw image data that is comprised of an array of pixels, each pixel within the array of pixels comprising ultrasound information;
   process the raw image data through a first fully convolutional network to generate a first segmentation label map, wherein:
     the first segmentation label map comprises a first set of objects that have been segmented into at least a coarse segmentation class, and
     each object within the first set of objects corresponds to a group of pixels from the array of pixels;
   process the first segmentation label map through a second fully convolutional network to generate a second segmentation label map, wherein:
     processing the first segmentation label map through the second fully convolutional network is performed using the raw image data as a base reference,
     the second segmentation label map comprises a second set of objects that have been segmented into a fine segmentation class, and
     each object within the second set of objects corresponds to a group of pixels from the array of pixels;
   apply a contour optimization algorithm to at least one object within the second set of objects, wherein the contour optimization algorithm refines a corresponding contour boundary for the at least one object; and
   generate an identification that the at least one object corresponds to a lymph node.

12. The one or more hardware storage devices of claim 11, wherein applying the contour optimization algorithm includes applying a smoothness constraint on the corresponding boundary for the at least one object.

13. The one or more hardware storage devices of claim 11, wherein applying the contour optimization algorithm includes applying a convexity shape constraint on the corresponding boundary for the at least one object.

14. The one or more hardware storage devices of claim 11, wherein the first segmentation label map is a coarse label map, and wherein the second segmentation label map is a fine label map.

15. The one or more hardware storage devices of claim 11, wherein the corresponding contour boundary for the at least one object initially includes an irregular portion, and wherein refining the corresponding contour boundary for the at least one object results in smoothing the irregular portion.

16. A method for segmenting tissue objects that are included within an ultrasound image, the method being implemented by one or more processors of a computer system, the method comprising:
   receiving raw image data that is comprised of an array of pixels, each pixel within the array of pixels comprising ultrasound information;
   processing the raw image data through a first fully convolutional network to generate a first segmentation label map, wherein:
     the first segmentation label map comprises a first set of objects that have been segmented into at least a coarse segmentation class, and
     each object within the first set of objects corresponds to a group of pixels from the array of pixels;
   processing the first segmentation label map through a second fully convolutional network to generate a second segmentation label map, wherein:

processing the first segmentation label map through the second fully convolutional network is performed using the raw image data as a base reference, the second segmentation label map comprises a second set of objects that have been segmented into a fine segmentation class, and each object within the second set of objects corresponds to a group of pixels from the array of pixels;

applying a contour optimization algorithm to at least one object within the second set of objects, wherein the contour optimization algorithm refines a corresponding contour boundary for the at least one object; and generating an identification that the at least one object corresponds to a lymph node.

17. The method of claim 16, wherein all objects in the second set correspond only to lymph nodes.

18. The method of claim 16, wherein applying the contour optimization algorithm includes applying a soft convex-shape constraint.

19. The method of claim 16, wherein (1) the raw image data, (2) the first segmentation label map, and (3) the second segmentation label map are displayed simultaneously with each other on a user interface of the computer system.

20. The method of claim 19, wherein a format of all objects in the second set is different than a format of all objects in the first set on the user interface.

* * * * *

UNITED STATES PATENT AND TRADEMARK OFFICE
CERTIFICATE OF CORRECTION

| | |
|---|---|
| PATENT NO. | : 10,957,045 B2 |
| APPLICATION NO. | : 16/346533 |
| DATED | : March 23, 2021 |
| INVENTOR(S) | : Danny Ziyi Chen et al. |

It is certified that error appears in the above-identified patent and that said Letters Patent is hereby corrected as shown below:

In the Specification

Column 1, Line 15 - insert the following paragraph prior to the Background section:
--STATEMENT REGARDING FEDERALLY SPONSORED RESEARCH
This invention was made with government support under CCF1217906 and CCF1617735 awarded by The National Science Foundation. The government has certain rights in the invention.--

Signed and Sealed this
Sixteenth Day of August, 2022

Katherine Kelly Vidal
*Director of the United States Patent and Trademark Office*